US008649456B2

(12) United States Patent
Xia et al.

(10) Patent No.: US 8,649,456 B2
(45) Date of Patent: Feb. 11, 2014

(54) SYSTEM AND METHOD FOR CHANNEL INFORMATION FEEDBACK IN A WIRELESS COMMUNICATIONS SYSTEM

(75) Inventors: Pengfei Xia, San Diego, CA (US); Yang Tang, San Diego, CA (US); Zhigang Rong, San Diego, CA (US); Linhong Chen, Rolling Meadows, IL (US)

(73) Assignee: FutureWei Technologies, Inc., Plano, TX (US)

( * ) Notice: Subject to any disclaimer, the term of this patent is extended or adjusted under 35 U.S.C. 154(b) by 682 days.

(21) Appl. No.: 12/722,450

(22) Filed: Mar. 11, 2010

(65) Prior Publication Data

US 2010/0232525 A1 Sep. 16, 2010

Related U.S. Application Data

(60) Provisional application No. 61/159,689, filed on Mar. 12, 2009, provisional application No. 61/162,591, filed on Mar. 23, 2009, provisional application No. 61/234,113, filed on Aug. 14, 2009.

(51) Int. Cl.
*H04L 1/02* (2006.01)

(52) U.S. Cl.
USPC ........... 375/267; 375/260; 375/295; 375/299; 370/208; 370/209; 370/328; 370/329; 370/330; 370/331; 370/332; 370/333; 370/334; 370/335; 370/336; 370/337; 370/338; 370/342; 370/441; 370/252; 370/251

(58) Field of Classification Search
USPC ................. 375/260, 267, 295, 296, 347, 299; 370/252, 208–209, 328–338, 342–344, 370/441
See application file for complete search history.

(56) References Cited

U.S. PATENT DOCUMENTS 8,208,458 B2 *  6/2012  Tang et al. ............... 370/342
8,243,610 B2 *  8/2012  Rong et al. ............... 370/251

(Continued)

FOREIGN PATENT DOCUMENTS

CN  1592144 A  3/2005
CN  1909402 A  2/2007

(Continued)

OTHER PUBLICATIONS

Samsung, "Codebook Design for 8 TX Transmission in LTE-A," 3GPP TSG RAN WG1 Meeting # 56 R1-090618, Feb. 9-13, 2009, 7 pages, Athens, Greece.*

(Continued)

*Primary Examiner* — Daniel Washburn
*Assistant Examiner* — Eboni Hughes
(74) *Attorney, Agent, or Firm* — Slater & Matsil, L.L.P.

(57) ABSTRACT

A system and method for channel information feedback in a wireless communications system is provided. A method for communications device operation includes receiving a pilot transmitted by a controller, computing a channel estimate for a channel between the controller and a communications device, the computing based on the pilot, computing a channel correlation matrix for the channel based on the channel estimate, and transmitting a reduced rank representation of the channel correlation matrix to the controller as a first feedback information. The method also includes adapting a first codebook based on the reduced rank representation of the channel correlation matrix, computing a representation of the channel using the adapted codebook, transmitting the representation of the channel as a second feedback information, and receiving a transmission beamformed based on the first feedback information and the second feedback information.

25 Claims, 9 Drawing Sheets

(56) References Cited

U.S. PATENT DOCUMENTS

| | | | | |
|---|---|---|---|---|
| 8,300,616 | B2* | 10/2012 | Tang | 370/342 |
| 8,351,455 | B2* | 1/2013 | Tang et al. | 370/437 |
| 2003/0058205 | A1* | 3/2003 | Yarita et al. | 345/87 |
| 2003/0185309 | A1 | 10/2003 | Pautler et al. | |
| 2005/0032521 | A1 | 2/2005 | Lee et al. | |
| 2008/0304464 | A1* | 12/2008 | Borkar et al. | 370/342 |
| 2008/0317145 | A1* | 12/2008 | Clerckx et al. | 375/260 |
| 2009/0017769 | A1* | 1/2009 | Chen et al. | 455/69 |
| 2009/0296788 | A1* | 12/2009 | Hottinen | 375/219 |
| 2010/0091893 | A1* | 4/2010 | Gorokhov | 375/260 |
| 2010/0142599 | A1* | 6/2010 | Tang et al. | 375/219 |
| 2010/0177742 | A1* | 7/2010 | Tang et al. | 370/335 |
| 2010/0232525 | A1* | 9/2010 | Xia et al. | 375/259 |
| 2010/0238913 | A1* | 9/2010 | Xia et al. | 370/342 |
| 2010/0265841 | A1* | 10/2010 | Rong et al. | 370/252 |
| 2012/0039416 | A1* | 2/2012 | Tang et al. | 375/296 |
| 2012/0082116 | A1 | 4/2012 | Kwon et al. | |

FOREIGN PATENT DOCUMENTS

| | | |
|---|---|---|
| CN | 1921463 A | 2/2007 |
| CN | 101136718 A | 3/2008 |
| CN | 101253709 A | 8/2008 |
| EP | 1865619 A1 | 12/2007 |
| JP | 2005509316 A | 4/2005 |
| JP | 2008125069 A | 5/2008 |
| WO | WO 2007/050860 A1 | 5/2007 |
| WO | WO 2008/147121 A1 | 12/2008 |
| WO | WO 2009/022873 A2 | 2/2009 |
| WO | WO 2009/023681 A2 | 2/2009 |

OTHER PUBLICATIONS

Supplementary European Search Report received in European Application No. 10750379.9-1246, mailed Apr. 5, 2012, 10 pages.

International Search Report received in the Patent Cooperation Treaty Application No. PCT/CN2010/071023, mailed Jun. 17, 2010, 4 pages.

Written Opinion of the International Searching Authority received in Patent Cooperation Treaty Application No. PCT/CN2010/071023, mailed Jun. 17, 2010, 6 pages.

Zhou, S., et al., Optimal Transmitter Eigen-Beamforming and Space-Time Block Coding Based on Channel Correlations, 2002, pp. 553-557, IEEE.

Zhou, S., et al., "Optimal Transmitter Eigen-Beamforming and Space-Time Block Coding Based on Channel Correlations," Transactions on Information Theory, Jul. 2003, pp. 1673-1690, vol. 49, No. 7, IEEE.

Love, D. J., et al., "Grassmannian Beamforming for Multiple-Input Multiple-Output Wireless Systems," Transactions on Information Theory, Oct. 2003, pp. 2735-2747. vol. 49, No. 10, IEEE.

Xia, P., et al. "Design and Analysis of Transmit-Beamforming Based on Limited-Rate Feedback," 2004, pp. 1653-1657, IEEE.

Xia, P., et al., "Achieving the Welch Bound with Difference Sets," Transactions on Information Theory, May 2005, pp. 1900-1907, vol. 51, No. 5, IEEE.

Love, D. J., et al., "Limited Feedback Diversity Techniques for Correlated Channels," Transactions on Vehicular Technology, Mar. 2006, pp. 718-722, vol. 55, No. 2, IEEE.

Xia, P., et al., "Design and Analysis of Transmit-Beamforming Based on Limited-Rate Feedback," Transactions on Signal Processing, May 2006, pp. 1853-1863, vol. 54, No. 5, IEEE.

Cmcc, et al., "Support for MBSFN Operation," 3GPP TSG RAN WG1 # 49 R1-072483, May 7-11, 2007, 5 pages, Kobe, Japan.

Samsung, et al., "Codebook Design for 4Tx SU MIMO," 3GPP TSG RAN WG1 Meeting # 49 R1-072235, May 7-11, 2007, pp. 1-17, Kobe, Japan.

Huawei, "Adaptive Codebook Designs for MU-MIMO," 3GPP TSG RAN WG1 Meeting # 56bis R1-091282, Mar. 23-27, 2009, 8 pages, Seoul, Korea.

Ericsson, et al., "On CSI Feedback for IMT-Advanced Fulfilling CoMP Schemes," 3GPP TSG RAN WG1 Meeting # 57bis R1-092737, Jun. 29, 2009—Jul. 3, 2009, 3 pages, Los Angeles, CA, USA.

"First Office Action of Chinese Application No. 201080009377.3," mailing date: Mar. 22, 2013, 10 pages.

"Chinese Search Report for Application No. 201080009377.3," mailing date: Mar. 14, 2013, 2 pages.

"Notice of Reasons for Rejection," Application No. JP 2011-553270, mailing date: Apr. 2, 2013, 8 pages.

* cited by examiner

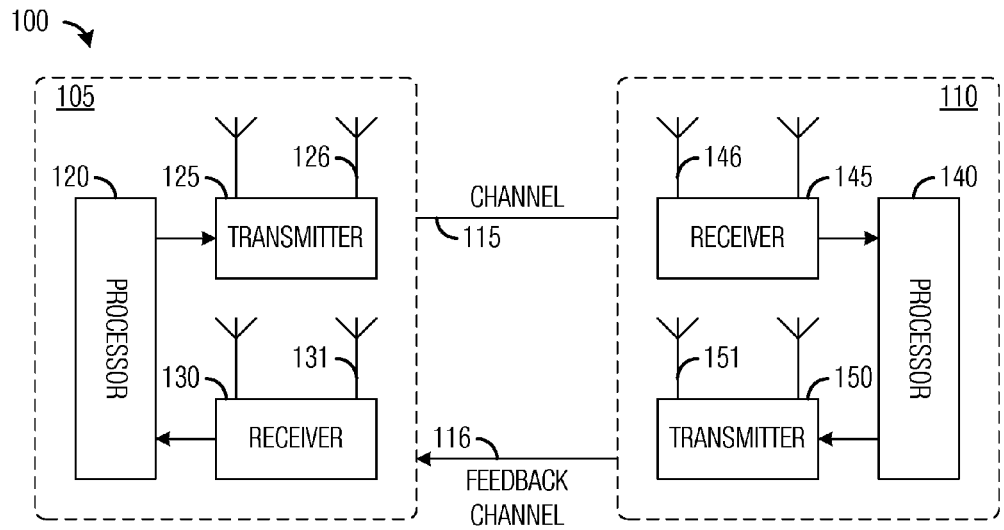
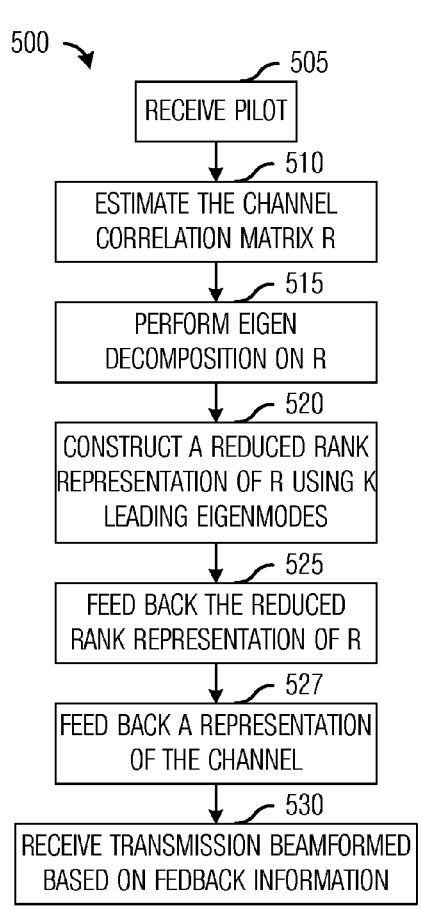
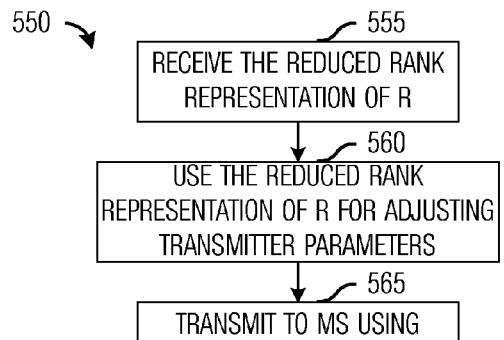
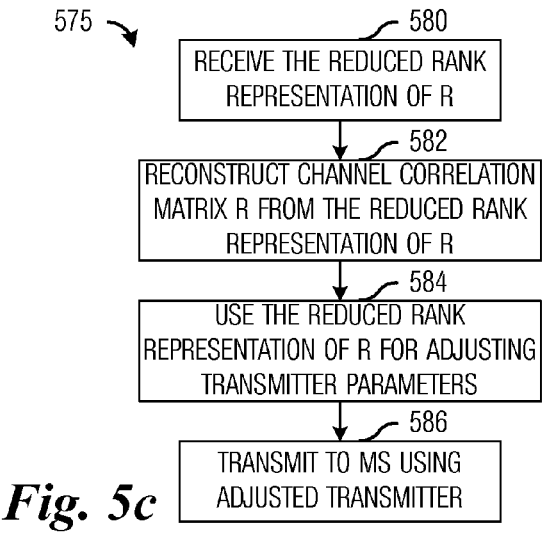
Fig. 1
Fig. 5a
Fig. 5b
Fig. 5c

SYSTEM AND METHOD FOR CHANNEL INFORMATION FEEDBACK IN A WIRELESS COMMUNICATIONS SYSTEM

This application claims the benefit of U.S. Provisional Applications: No. 61/159,689, filed on Mar. 12, 2009, entitled "Method and Apparatus for Feeding Back Channel Correlation Information in Wireless Communications Systems"; No. 61/162,591, filed on Mar. 23, 2009, entitled "System and Method for Adaptive Codebook Designs for Multiuser MIMO"; and No. 61/234,113, filed on Aug. 14, 2009, entitled "Adaptive Feedback for MIMO Communications," which applications are hereby incorporated herein by reference.

TECHNICAL FIELD

The present invention relates generally to wireless communications, and more particularly to a system and method for channel information feedback in a wireless communications system.

BACKGROUND

Generally, in a wireless communications system, the communications system's capacity may be significantly improved when a transmitter (also referred to as a base station (BS)) has full or partial knowledge of a channel over which it will be transmitting. Information related to the channel may be referred to as channel state information (CSI). CSI may be obtained by the transmitter over a reverse feedback channel. A receiver (also referred to as a mobile station (MS)) of transmissions made by the transmitter may transmit CSI back to the transmitter over the reverse feedback channel. The receiver may estimate the channel, generate the CSI, and feed the CSI back to the transmitter.

However, since CSI feedback consumes communications system bandwidth, there is a desire to minimize the amount of information being fedback to the transmitter. Reducing the amount of information being fedback may involve the use of techniques such as compression, quantization using codebooks, partial information feedback, and so forth.

Channel information may be in the form of instantaneous channel feedback information, such as, codebook based limited rate feedback, or statistical channel information, such as, channel mean, channel correlation matrix, and so forth. Channel information is typically fedback from the receiver to the transmitter.

Transmit precoding/beamforming with limited feedback has been studied extensively and demonstrates significant performance gain in single user multiple input, multiple output (SU-MIMO). In general, a precoding codebook needs to be designed and maintained at both transmitter and receiver to facilitate the operation of limited feedback transmit precoding. The precoding codebook may be a collection of candidate precoding matrices and vectors and may serve as a common dictionary of current channel conditions to the transmitter and receiver.

It has been realized that codebooks should be designed to match the underlying channel characteristics. For example, for SU-MIMO independent identically distributed (iid) Rayleigh fading channels, Grassmannian line/subspace packing (GLP) based codebook has been shown to achieve near optimal performance. On the other hand, those GLP codebooks perform not so well under spatially correlated fading channels, wherein other codebooks have been shown to be relatively more robust, e.g., discrete Fourier transform (DFT) based codebooks and Householder based codebooks, among others. Other examples of codebooks may be complex Hadamard transform (CHT) based codebooks.

SUMMARY

These and other problems are generally solved or circumvented, and technical advantages are generally achieved, by embodiments of a system and method for channel information feedback in a wireless communications system.

In accordance with an embodiment, a method for a communications device operation is provided. The method includes receiving a pilot transmitted by a controller, computing a channel estimate for a channel between the controller and a communications device, the computing being based on the pilot, computing a channel correlation matrix for the channel based on the channel estimate, transmitting a reduced rank representation of the channel correlation matrix to the controller as a first feedback information, adapting a first codebook based on the reduced rank representation of the channel correlation matrix, computing a representation of the channel using the adapted first codebook, transmitting the representation of the channel as a second feedback information, and receiving a transmission beamformed based on the first feedback information and the second feedback information.

In accordance with another embodiment, a method for communications node operations is provided. The method includes estimating a communications channel between a communications node and a controller serving the communications node, quantizing the estimated communications channel based on an adapted codebook by selecting a codeword from the adapted codebook that maximizes a first selection criterion, transmitting an index to the selected codeword to the controller, estimating channel statistics for the communications channel, adjusting the adapted codebook based on the channel statistics, quantizing the channel statistics based on a channel statistics codebook by selecting a channel statistics codeword from the channel statistics codebook that maximizes a second selection criterion, transmitting a channel statistics index to the channel statistics codebook to the controller, and receiving a transmission from the controller, wherein the transmission is precoded based on the index and the channel statistics index.

In accordance with another embodiment, a method for quantizing feedback information is provided. The method includes receiving a pilot transmitted by a controller, computing a channel estimate for a channel between the controller and a communications device, the computing being based on the pilot, transforming the channel estimate into its representation in a subspace of the channel, quantizing the transformed channel estimate using a codebook, thereby producing an index to a codeword in the codebook, transmitting the index to the controller, and receiving a transmission beamformed based on the index and the subspace.

In accordance with another embodiment, a method for communications node operation is provided. The method includes estimating a communications channel between a communications node and a controller serving the communications node, transforming the estimated communications channel with channel statistics, thereby producing a transformed estimate of the communications channel, quantizing the transformed estimate of the communications channel based on a first codebook by selecting a codeword from the first codebook that maximizes a first selection criterion, transmitting a first index to the selected codeword to the controller, estimating the channel statistics for the communications channel, adjusting the first codebook based on the channel statistics, quantizing the channel statistics based on a second codebook by selecting a second codeword from the second codebook that maximizes a second selection criterion, transmitting a second index to the second codebook to the controller, and receiving a transmission from the controller, wherein the transmission is precoded based on the first index and the second index.

An advantage of an embodiment is that both short term channel information and long term channel information may be used to improve communications system capacity. The short term channel information may be used to adjust transmission precoding to meet rapidly changing channel conditions, while the long term channel information makes use of channel statistics to allow for the adaptation of codebooks and channels using slowly changing channel parameters.

A further advantage of an embodiment is that a number of techniques for reducing feedback information overhead are provided. Reduced feedback information overhead may help to improve overall communications performance by allowing a greater percentage of communications to be used in transmitting information.

Yet another advantage of an embodiment is that an alternative approach to deriving feedback information is provided that may reduce both the amount of feedback information needed as well as the amount of resources required for determining the feedback information. Reductions in the amount of feedback information as well as the amount of resources may help to both improve overall communications system performance as well as reduce costs by reducing resources needed at communications devices operating in the communications system.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1 is a diagram of a portion of a communications system;

FIG. 5a is a flow diagram of MS operations for feeding back partial channel information to a BS;

FIG. 5b is a flow diagram of a first BS operation for transmitting to a MS based on received partial channel information;

FIG. 5c is a flow diagram of a second BS operation for transmitting to a MS based on received partial channel information;

DETAILED DESCRIPTION OF ILLUSTRATIVE EMBODIMENTS

Figure 2A:
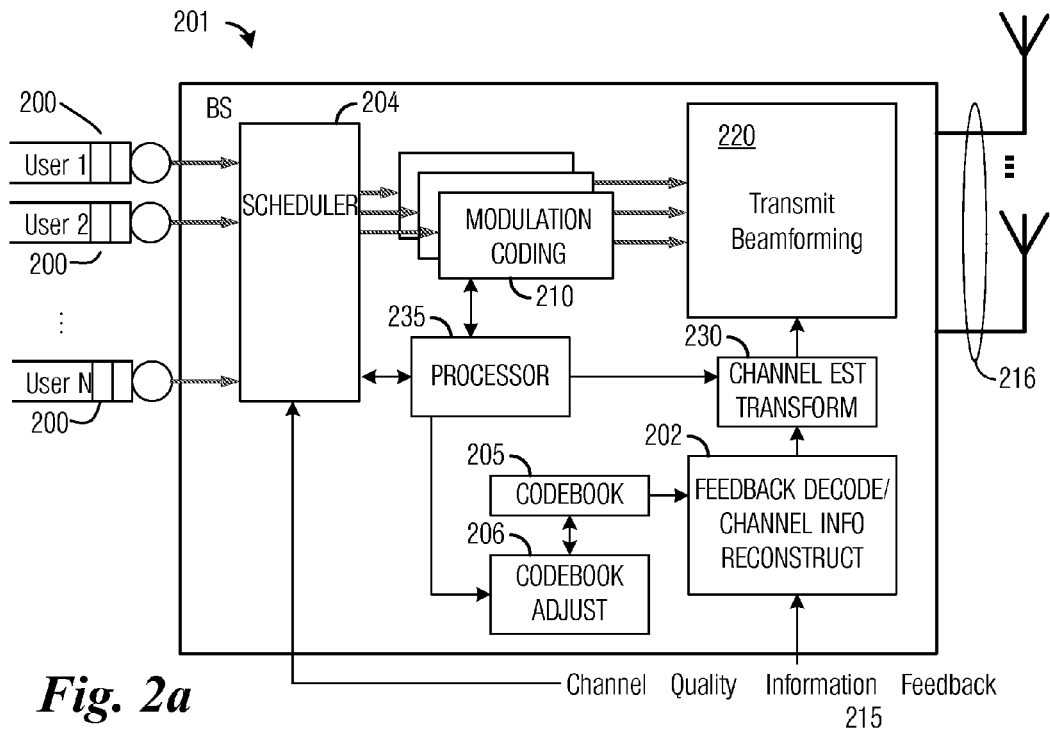
FIG. 2a is a diagram of a BS.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant wireless communications system. The invention may also be applied, however, to other wireless communications systems, such as those compliant to technical standards such as, LTE-Advanced (LTE-A), WiMAX, and so forth, that make use of feedback information to improve communications system performance. The embodiments may be applied to both single user multiple input, multiple output (SU-MIMO) and multiuser multiple input, multiple output (MU-MIMO) communications systems.

FIG. 1 illustrates a portion of a communications system 100. Communications system 100 includes a base station (BS) 105 and a mobile station (MS) 110. BS 105 communicates with MS 110 over channel 115, and MS 110 feeds back information, including channel information, to BS 105 over feedback channel 116. Channel 115 may include a downlink (DL) channel (from BS 105 to MS 110) and an uplink (UL) channel (from MS 110 to BS 105), while feedback channel 116 may be used exclusively for MS 110 to transmit information back to BS 105.

BS 105 includes a processor 120, a transmitter 125 with at least one transmit antenna 126, and a receiver 130 with at least one receive antenna 131. Similarly, MS 110 includes a processor 140, a receiver 145 with at least one receive antenna 146, and a transmitter 150 with at least one transmit antenna 151.

Receiver 145 of MS 110 receives transmissions made by transmitter 125 of BS 105 and from the received transmissions, processor 140 may compute channel information, such as channel mean, channel correlation matrix, and so forth. The channel information (in full or partial form) may be transmitted back to BS 105, where it is received by receiver 130 and provided to processor 120 that makes use of the channel information to design future transmissions.

The channel information fedback to BS 105 by MS 110 may be in the form of time domain channel information or frequency domain channel information or a combination thereof. Time domain channel information may be in the form of short term channel information or long term channel information, while frequency domain channel information may be in the form of subband channel information or wideband channel information. In general, long term channel information and/or wideband channel information may be collectively referred to as channel statistics. Short term channel information may include channel mean, and so on.

Examples of long term channel information include long term channel statistics, a function of the long term channel statistics, a time domain channel correlation matrix, eigenvectors of the time domain channel correlation matrix, eigenvalues of the time domain channel correlation matrix, angle of arrival and/or angle of departure of the channel, and so forth. Examples of wideband channel information include wideband channel characteristics, a function of the wideband channel statistics, a wideband channel correlation matrix, eigenvectors of the wideband channel correlation matrix, eigenvalues of the wideband channel correlation matrix, angle of arrival and/or angle of departure of the channel, and so on.

The discussion provided below focuses mainly on time domain channel information, i.e., short term channel information and/or long term channel information. However, the embodiments presented herein may be operable with either time domain channel information or frequency domain channel information. Therefore, the discussion of time domain channel information should not be construed as being limiting to either the scope or the spirit of the embodiments.

Short term channel information may be useful in designing transmissions at BS 105 due to rapidly changing channel conditions due to factors such as rapid mobility, channel fading, and so forth. Long term channel information may also be useful in designing transmissions, but may be more useful in adapting codebooks, transforming channels, and so on. Although both are useful on their own for designing transmissions, adapting codebooks, transforming channels, and so forth, it may be possible to combine short term channel information and long term channel information at different proportions/frequencies to further enhance communications system performance. For example, since long term channel information may remain substantially constant over short periods of time, long term channel information may not need to be fedback to BS 105 at a high frequency. However, long term channel information may provide a more accurate picture of actual channel behavior over time and may be more useful in adapting and transforming the transmission design since they tend to be immune to transient changes in the channel.

FIG. 2a illustrates a BS 201. Data 200, in the form of bits, symbols, or packets for example, destined for a plurality of MSs being served are sent to a scheduler 204, which decides which MSs will be transmitted to in a given time/frequency opportunity. For example, with MU-MIMO, scheduler 204 may select L out of K MSs for transmission at a given time, where K and L are integer values and L is less than or equal to K. The selection of the L MSs may be based on factors such as maximizing throughput, service history, MS priority, information priority, and so forth. While for SU-MIMO, scheduler 204 may select single MSs for transmission at a given time.

Data for MSs are processed by modulation and coding block 210 to convert to transmitted symbols and add redundancy for the purpose of assisting with error correction or error detection. The modulation and coding scheme is chosen based in part on information about the channel quality information feedback 215.

The output of modulation and coding block 210 is passed to a transmit beamforming block 220, which maps the modulated and coded stream for each MS onto a beamforming vector. The beamformed outputs are coupled to antennas 216 through RF circuitry. The transmit beamforming vectors may be determined by transmit beamforming block 220, which may determine the transmit beamforming vectors based on channel quality information feedback 215 as well as information from scheduler 204, which may include information regarding the MSs selected for transmission, and so on.

Feedback decode/channel information reconstruct unit 202 decodes feedback information from channel quality information feedback 215. Decoding feedback information may involve the use of a codebook 205 if channel quality information feedback 215 was quantized using a codebook by a MS. Codebook 205 may be a baseline codebook as specified by a technical standard, provided by an operator of a communications system that includes BS 201, or so forth. Alternatively, codebook 205 may be an adapted codebook that is originally a baseline codebook that has been adapted using long term channel information (in full or partial form) or a function of long term channel information provided by the MS. Adaptation of codebook 205 may be performed by codebook adjust unit 206. Codebook adjust unit 206 may adapt codebook 205 using feedback information provided in channel quality information feedback 215. Codebook 205 may be implemented as a memory capable of storing a number of different codebooks, such as different baseline codebooks for different channel models, different codebooks for different MSs, different adapted codebooks for different MSs, and so forth.

In addition to including a baseline codebook and an adapted codebook, codebook 205 may also include additional codebooks that may be used to quantize channel information. For example, codebook 205 may include a codebook used to quantize channel statistics (either time domain channel statistics and/or frequency domain channel statistics), a transformed channel estimate, wherein a channel estimate is transformed based on a subspace of the channel, such as a long term channel eigenspace, a wideband channel eigenspace, and so forth.

Additionally, channel quality information feedback 215 may be encoded to protect from transmission errors. If so protected, feedback decode/channel information reconstruct unit 202 may remove the encoding used to protect channel quality information feedback 215 to produce feedback information.

Output of feedback decode/channel information reconstruct unit 202 (e.g., channel state information, channel statistics, channel correlation matrices, and so forth) may be provided to channel estimate transform unit 230. Channel estimate transform unit 230 may be used to transform an estimate of the channel to comply with a transformed channel model used at the MS. For example, channel estimate transform unit 230 may transform the channel estimate into a subspace of the channel, e.g., a long term channel eigenspace or a wideband channel eigenspace, representation of the channel estimate. Additional details on the transformed channel model are provided below. Channel quality information feedback 215 may also be provided to scheduler 204, which may use the information in its scheduling of MSs.

Scheduler 204 may use any of the known scheduling disciplines in the literature including round robin, maximum sum rate, proportional fair, minimum remaining processing time, or maximum weighted sum rate; generally scheduling decisions are based on channel quality information feedback 215 received from the plurality of MSs. Scheduler 204 may decide to send information to a single MS via transmit beamforming (SU-MIMO) or may decide to serve multiple MSs simultaneously through MU-MIMO communications.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment may be made based on channel quality information feedback 215 in a preferred embodiment and may be determined jointly in scheduler 204.

While not explicitly illustrated, it is obvious to those of ordinary skill in the art that OFDM modulation can be used. Further, any number of multiple access techniques could be used including orthogonal frequency division multiple access, code division multiple access, frequency division multiple access, or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements. A processor 235 may be used to execute applications for BS 201, and may be used to control the operation of units such as codebook adjust unit 206, channel estimate transform unit 230, modulation and coding block 210, scheduler 204, and so forth.

Figure 2B:
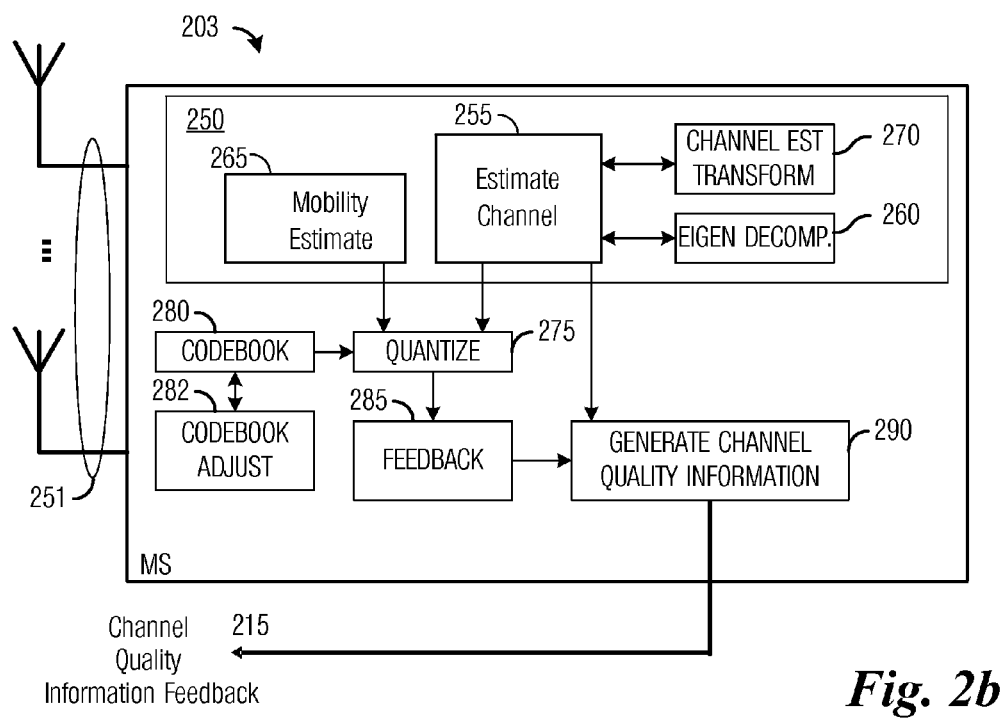
FIG. 2b is a diagram of a MS.

FIG. 2b illustrates MS 203. MS 203 may have one or more receive antennas 251, connecting through RF circuitry to a receiver signal processing block 250. Some of the key components of receiver signal processing block 250 include channel estimation block 255, eigen decomposition block 260, and a mobility estimate block 265.

Channel estimation block 255 may employ any number of algorithms known in the art including least squares, maximum likelihood, maximum a postiori, Bayes estimator, adaptive estimator, a blind estimator, or so forth, to estimate a channel between MS 203 and its serving BS. Some algorithms exploit known information inserted into the transmit signal in the form of training signals, training pilots, while others use structure in the transmitted signal such as cyclostationarity to estimate coefficients of the channel between the BS and the MS.

Eigen decomposition block 260 may be used to compute eigen components of a channel correlation matrix of a channel between MS 203 and its serving BS. According to an embodiment, eigen decomposition block 260 may make use of eigen decomposition to compute the eigen components from the channel correlation matrix provided by channel estimation block 255, which may then be fedback to the BS serving MS 203. According to an embodiment, a subset of the total number of eigenvalues are fedback to the BS. For example, if the channel correlation matrix decomposes into four eigen components, then two largest eigen components may be fedback. It may be also possible to further reduce the amount of information fedback to the BS by quantizing the eigenvalues using quantization block 275 using codebook 280. Codebook 280 may be a baseline codebook as specified by a technical standard, provided by an operator of a communications system that includes MS 203, or so forth. Alternatively, codebook 280 may be an adapted codebook that is originally a baseline codebook that has been adapted using long term channel information (in full or partial form) or a function of long term channel information measured by MS 203. Adaptation of codebook 280 may be performed by codebook adjust unit 282. Codebook adjust unit 282 may adapt codebook 280 using channel information, such as long term channel information measured by MS 203. Codebook 280 may be implemented as a memory capable of storing a number of different codebooks, such as different baseline codebooks for different channel models, different adapted codebooks adapted from different baseline codebooks, and so forth.

A channel estimate transform block 270 may be used to transform a model of the channel between the BS and MS 203. For example, channel estimate transform unit 230 may transform the channel estimate into a subspace of the channel, e.g., a long term channel eigenspace or a wideband channel eigenspace, representation of the channel estimate. The transformation of the model of the channel between the BS and MS 203 may allow for a reduction in the amount of channel feedback information by feeding back a different form of channel feedback information that may be amenable to quantization using codebooks as well as reduced dimensionality, which leads to reduced codebook size, thereby increasing codebook resolution while maintaining constant codebook size or reducing codebook size while maintaining codebook resolution. Transforming the model of the channel with quantization may be shown to be equivalent to codebook quantization of an untransformed model of the channel. A detailed discussion of the transformation of the model of the channel is provided below.

As discussed above, channel state information produced from information provided by channel estimation block 255 may be quantized using a quantization block 275. Quantization block 275 quantizes the channel state information using codebook 280. An index from codebook 280 may be output from quantization block 275. An estimate of the amount of channel variation, produced by mobility estimate block 265, may be used to improve the quantization algorithm by initializing the algorithm from a previous quantization level or adjusting the amount of localization.

Feedback block 285 generates a new feedback message by combining the codebook indices output from quantization block 275. Generate channel quality information block 290 generates a special feedback control message employing the outputs of feedback block 285 to produce channel quality information feedback 215. Generate channel quality information block 290 may also apply an error correcting code to protect information in the feedback message from errors.

Figure 3A:
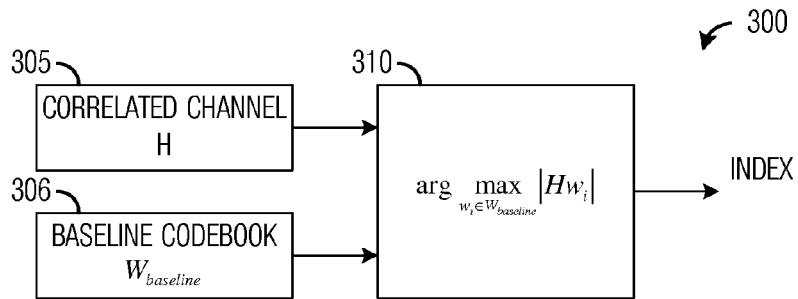
FIGS. 3a through 3d are diagrams of models of channel information feedback with and without codebook quantization.

FIG. 3a illustrates a first model 300 of codebook quantization of channel information feedback, wherein a baseline codebook is used for quantization. First model 300 includes a channel to be quantized H 305 and a baseline codebook $W_{baseline}$ 306. A quantizer 310 may have a transfer function expressible as $$\arg\max_{w_i \in W_{baseline}} |Hw_i|.$$

An output of quantizer 310 may be an index to codeword $w_i$ in baseline codebook $W_{baseline}$ 306 that satisfies the transfer function of quantizer 310 and may be fedback to a transmitter, such as BS 201.

Figure 3B:
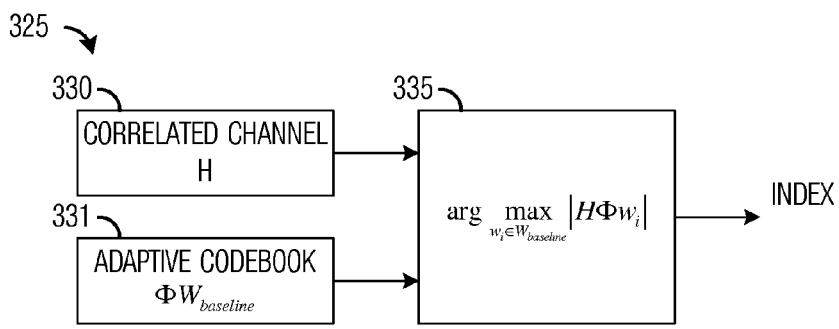

FIG. 3b illustrates a second model 325 of codebook quantization of channel information feedback, wherein an adaptive codebook is used for quantization. Second model 325 also includes a channel to be quantized H 330. But rather than a baseline codebook, second model 325 includes an adaptive codebook $\Phi W_{baseline}$ 331. Adaptive codebook $\Phi W_{baseline}$ 331 may be based on a baseline codebook $W_{baseline}$, for example, adaptive codebook $\Phi W_{baseline}$ 331 may be a result of a multiplication of a baseline codebook $W_{baseline}$ with a function of a channel correlation matrix (or some other long term channel information) $\Phi$. A quantizer 335 may have a transfer function expressible as $$\arg\max_{w_i \in W_{baseline}} |H\Phi w_i|.$$

An output of quantizer 335 may be an index to codeword $w_i$ in a baseline codebook $W_{baseline}$ that satisfies the transfer function of quantizer 335 and may be fedback to a transmitter, such as BS 201.

At the transmitter, in order to reconstruct the channel estimate of the channel to be quantized H 330, the transmitter may need an index to the baseline codebook $W_{baseline}$ and the long term channel information, such as the channel correlation matrix, channel statistics, or so forth, $\Phi$, used to adapt the baseline codebook $W_{baseline}$. Therefore, a receiver, such as MS 203, should provide, as feedback information, the index to the baseline codebook $W_{baseline}$ and the long term channel information, such as the channel correlation matrix, channel statistics, or so forth, $\Phi$, to the transmitter. The receiver may utilize codebook quantization to reduce feedback information overhead. If codebook quantization is used, then it may be necessary to use multiple codebooks, one for the index and one for the long term channel information. Furthermore, if the long term channel information is in the form of a channel correlation matrix, then the receiver may further reduce feedback information overhead by feeding back a reduced rank representation of the channel correlation matrix.

Adaptive codebook $\Phi W_{baseline}$ 331 and channel to be quantized H 330 match in terms of having the same first and second order moments. Adaptive codebook $\Phi W_{baseline}$ 331 is commonly referred to as being a matching codebook.

Figure 3C:
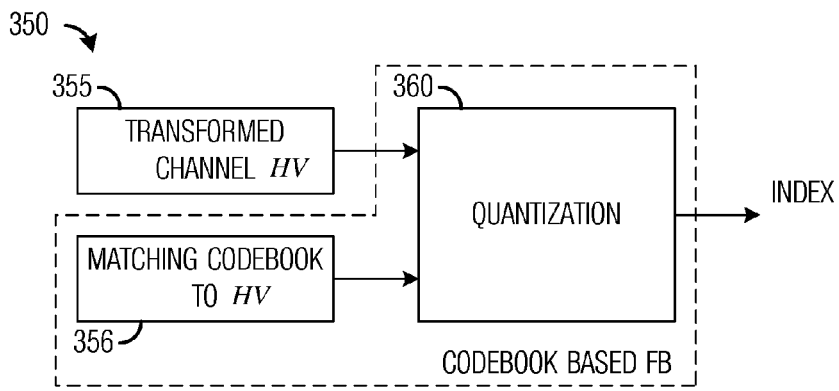

FIG. 3c illustrates a third model 350 of codebook quantization of channel information feedback, wherein a baseline codebook is used for quantization after a channel transformation has been applied. Second model 325 may be equivalently expressed as third model 350 and includes a transformed channel to be quantized HV 355 that may be a transformed version of channel to be quantized H 330 and a matching codebook to HV 356, where V may be an eigenvector matrix based on the channel correlation matrix R. A quantizer 360 may attempt to quantize the transformed channel HV (e.g., transformed channel to be quantized HV 355) in its long term channel eigenspace rather than quantizing the channel H (e.g., channel to be quantized H 330) directly. An output of quantizer 360 may be an index to a codeword in matching codebook to HV 356 that satisfies the transfer function of quantizer 360 and may be fedback to a transmitter, such as BS 201.

At the transmitter, in order to reconstruct the channel estimate of the channel to be quantized H 330, the transmitter may need an index to the matching codebook to HV and V, the eigenvector matrix based on the channel correlation matrix R. Therefore, a receiver, such as MS 203, should provide, as feedback information, the index to the matching codebook to HV and V, to the transmitter. The receiver may utilize codebook quantization to reduce feedback information overhead. If codebook quantization is used, then it may be necessary to use multiple codebooks, one for the index and one for V.

Figure 3D:
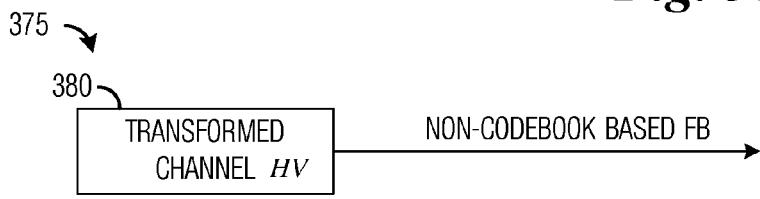

FIG. 3d illustrates a fourth model 375 of channel information feedback, wherein a channel transformation has been applied. Fourth model 375 may feedback full or partial information of a transformed channel HV 380 without codebook quantization of the information. Techniques such as partial information feedback may help to reduce feedback overhead.

Figures 4A, 4B:
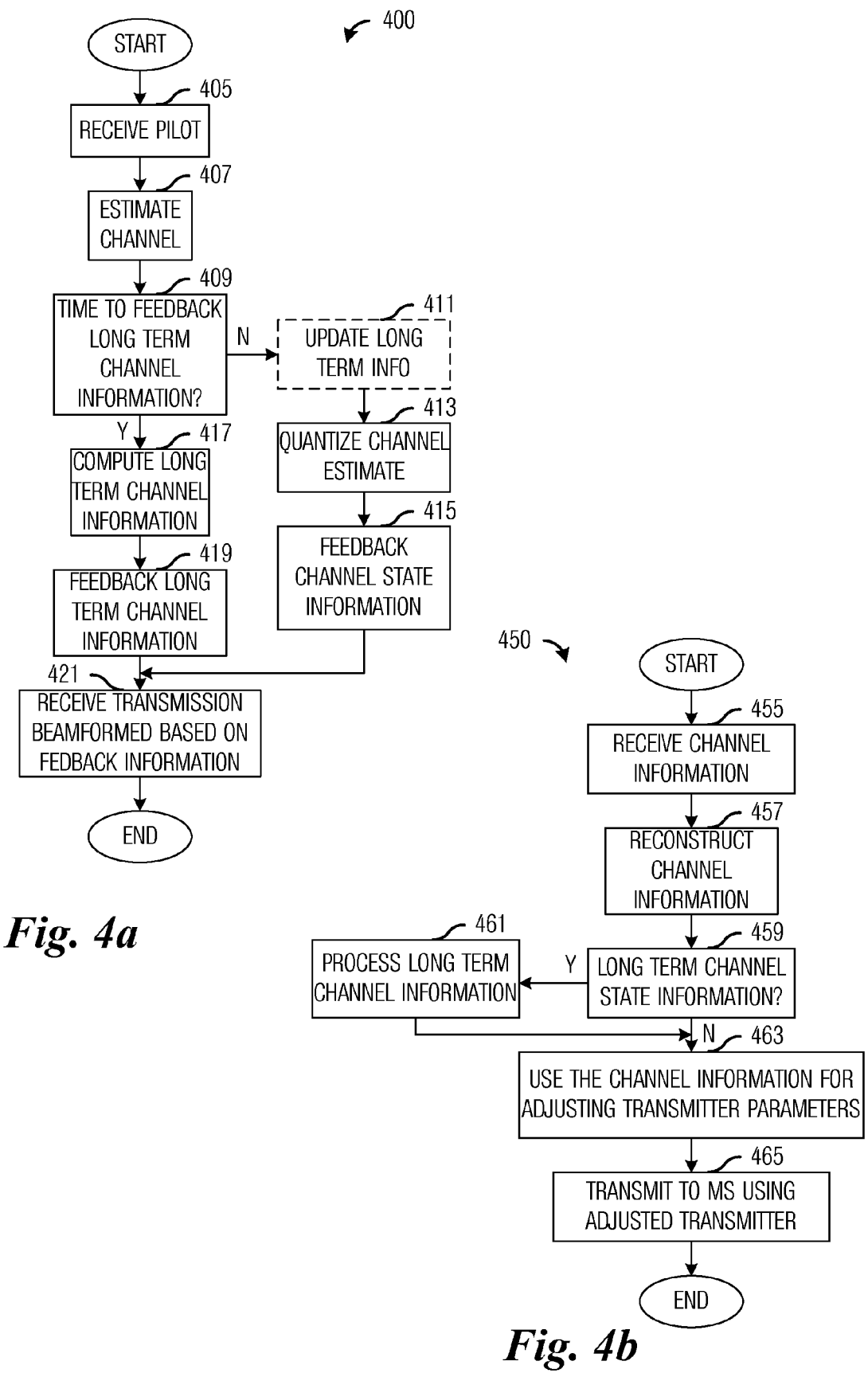
FIG. 4a is a flow diagram of MS operations for feeding back channel information to a BS.
FIG. 4b is a flow diagram of BS operations for transmitting to a MS.

FIG. 4a illustrates a flow diagram of MS operations 400 for feeding back channel information to a BS. MS operations 400 may be indicative of operations occurring in a MS, such as MS 203, as the MS feeds back channel information, both long term channel information and short term channel information, to a BS, such as BS 201. MS operations 400 may occur while the MS is in a normal operating mode and is communicating with the BS.

According to an embodiment, since short term channel information may be more transient than long term channel information, the MS may feedback short term channel information at a higher frequency than it feeds back long term channel information. For example, the MS may feedback short term channel information every few ms, the MS may feedback long term channel information every tens or hundreds of ms.

According to an alternative embodiment, the MS may not automatically feedback long term channel information. Rather, the MS may feedback long term channel information in response to an instruction issued by its serving BS. The BS may issue the instruction based on its own timing or due to an occurrence of an event, such as an error rate exceeding a threshold, a failure to meet a specified quality of service requirement, an addition or deletion of other MSs, or so on. In addition, the MS may also feedback short term channel information in response to receiving an instruction from the BS.

MS operations 400 may begin with the MS receiving a pilot (or a pilot signal) transmitted by the BS (block 405). A pilot may be a special signal transmitted by BSs to help MSs served by the BSs to acquire system information, measure channels, and so forth. According to an embodiment, rather than transmitting a pilot, the BS may transmit a reference signal. According to another embodiment, the BS may not transmit either a pilot or a reference signal. Instead, the MSs served by the BS may need to search for transmissions made by the BS.

The MS may measure a channel between the BS and itself using the pilot or the reference signal and then using the channel measurement generate an estimate of the channel (block 407). If the BS transmits neither the pilot nor the reference signal, the MS may be able to measure the channel by measuring transmissions made by the BS over a window of time.

The MS may perform a check to determine if it is time to feedback long term channel information to the BS (block 409). As discussed previously, the MS may feedback long term channel information at a lower frequency than a frequency that it feeds back short term channel information. Alternatively, the MS may feedback long term channel information in response to receiving an instruction from the BS. If it is not time to feedback long term channel information, the MS may optionally update its long term channel information using the estimate of the channel (block 411). The MS may then feedback short term channel information by quantizing the estimate of the channel (block 413) and feeding back an index corresponding to the quantized estimate of the channel to the BS (block 415).

If it is time to feedback long term channel information, the MS may compute the long term channel information to feedback (block 417). For example, if the long term channel information is a channel correlation matrix, the MS may either feedback the channel correlation matrix in its entirety or a part of the channel correlation matrix. For example, if the MS feeds back a part of the channel correlation matrix, the processing that the MS may need to perform may include eigenvalue decomposition and eigenvalue selection. The MS may the feedback the long term channel information (block 419).

The MS may then receive a transmission from the BS, wherein the transmission was beamformed using channel information fedback by the MS (block 421) and MS operations 400 may then terminate.

FIG. 4b illustrates a flow diagram of BS operations 450 for transmitting to a MS. BS operations 450 may be indicative of operations occurring in a BS, such as BS 201, as the BS receives feedback channel information from a MS, such as MS 203, that it uses to transmit information to the MS. BS operations 450 may occur while the BS is in a normal operating mode and is serving the MS.

As discussed previously, the MS may feedback short term channel information with higher frequency than it does feeding back long term channel information. According to an embodiment, the BS may be able to specify the frequencies for both the long term channel information and the short term channel information. According to an alternative embodiment, the BS may be able to initiate the MS into feeding back channel information (either long term or short term channel information) by sending an instruction to the MS.

BS operations 450 may begin with the BS receiving channel information feedback by the MS (block 455). The BS may reconstruct the channel information (block 457). For example, the channel information may be encoded to protect from transmission errors. The BS may decode the feedback channel information to reconstruct the channel information. Additionally, if the channel information is in the form of an index to a codebook, the BS may reference the codebook to reconstruct the channel information. Furthermore, the channel information may be an index to a matching codebook for a transformed channel estimate, the BS may use information from the matching codebook corresponding to the index and perform an inverse transformation to reconstruct the channel information.

The BS may perform a check to determine if the feedback channel information is long term channel information (block 459). As an example, long term channel information may be denoted by a flag set to a specific value in the feedback channel information. If the feedback channel information is long term channel information (block 459), then the BS may process the feedback channel information (e.g., long term channel information) (block 461). For example, the BS may use the long term channel information to adapt a baseline codebook that it will use to unquantize short term channel information. Furthermore, the BS may use the long term channel information to update an inverse transformation that it may use to reconstruct channel information quantized based on a transformed channel estimate.

The BS may use the feedback channel information (either long term channel information or short term channel information) to adjust transmitter parameters (block 463). For example, the BS may use the feedback channel information to compute a precoder for use in transmissions to the MS. The BS may use the adjusted transmitter to transmit to the MS (block 465) and BS operations 450 may then terminate.

According to an alternative embodiment, if the feedback channel information is long term channel information, the BS may elect to not use the feedback channel information to adjust transmitter parameters or transmit to the MS. Instead the BS may decide to wait for feedback channel information that is short term channel information.

FIG. 5a illustrates a flow diagram of MS operations 500 for feeding back partial channel information to a BS. MS operations 500 may be descriptive of operations occurring in a MS when the MS is computing feedback information (in the form of a channel correlation matrix (a form of long term channel information)) and then feeding the channel correlation matrix back to a base station (BS). MS operations 500 may execute periodically or continuously. Alternatively, MS operations 500 may execute upon occurrence of an event, such as when the MS receives a message requesting that it provide feedback information, or when a measured value exceeds a threshold. For example, a measured error metric, such as bit-error rate, frame-error rate, packet-error rate, or so forth, exceeds a specified threshold.

MS operations 500 may begin with the MS measuring a pilot(s) transmitted by the BS over a channel between the BS and the MS (block 505). Pilot(s) may be known sequences transmitted by the BS at known frequencies and times for use by receivers, such as the BS, to measure channel information. Alternatively, if the BS does not transmit pilots, the MS may measure transmissions made by the BS over time to measure channel information. From the measurement of the pilot(s), the MS may estimate a channel correlation matrix R (block 510). Estimation of the channel correlation matrix R from the pilot(s) is well known by those of ordinary skill in the art of the embodiments and will not be discussed herein.

Once the MS estimates the channel correlation matrix R, the MS may perform eigen decomposition of the channel correlation matrix R (block 515). Since the channel correlation matrix R is a Hermitian matrix, eigen decomposition may be defined as:

$$R = s_1 u_1 u'_1 + s_2 u_2 u'_2 + \ldots s_{N_t} u_{N_t} u'_{N_t},$$

where $s_1, s_2, \ldots, s_{N_t}$ are non-negative real-valued eigenvalues in decreasing order, and $u_1, u_2, \ldots, u_{N_t}$ are corresponding eigenvectors. $\{s_i, u_i\}$ is often referred to as the i-th eigenmode of the channel correlation matrix R. Optimal transmitter (e.g., the BS) performance may rely on the eigenmodes of the channel correlation matrix R. Therefore, the eigenmodes $\{s_i, u_i\}$ matter more to the transmitter than the channel correlation matrix R. Therefore, the eigenmodes may be fedback to the BS rather than the channel correlation matrix R.

Additionally, the eigenvector $u_1$ is more important than the eigenvector $u_{N_t}$ since $s_1 > s_{N_t}$. In many instances, it may be possible to approximate the channel correlation matrix R by a partial sum of its leading eigenmodes to reduce the feedback overhead without having to significantly sacrifice the accuracy of the feedback information. For example, it may be possible to use:

$$\hat{R} = s_1 u_1 u'_1 + s_2 u_2 u'_2 \text{ in place of } R = s_1 u_1 u'_1 + s_2 u_2 u'_2 + \ldots s_{N_t} u_{N_t} u'_{N_t}.$$

In other words, only the two leading eigenmodes are fedback to the BS instead of all Nt eigenmodes.

The actual number of eigenmodes that are fedback to the BS may be dependent on factors such as the operating environment of the wireless communications system, the signaling, encoding, and so forth, used in the wireless communications system, and so on. One possible technique may be to feedback all eigenmodes larger than a threshold (either an absolute threshold or a relative threshold). In general, the reduction in the feedback overhead may be on the order of 1−K/Nt, where K is the number of eigenmodes fedback and Nt is the number of eigenmodes.

The MS may construct a reduced rank representation of the channel correlation matrix R by using only the first K eigenmodes of the eigen decomposition of the channel correlation matrix R (block 520). The MS may then feedback the reduced rank representation of the channel correlation matrix to the BS (block 525). The MS may also feedback a representation of the channel (block 527). For example, the MS may feedback the channel estimate or a quantized version of the channel estimate. The MS may then receive a transmission from the MS, wherein the transmission may be beamformed based on feedback information provided by the MS (block 530). MS operation 500 may then terminate.

FIG. 5*b* illustrates a flow diagram of a first BS operation 550 for transmitting to a MS based on received partial channel information. BS operation 550 may be descriptive of operations occurring in a BS when the BS receives feedback information from a MS. BS operation 550 may execute periodically or whenever the BS receives feedback information from the MS.

BS operation 550 may begin when the BS receives a reduced rank representation of a channel correlation matrix R (block 555). The reduced rank representation of the channel correlation matrix R may be in the form of K eigenmodes from the BS. As discussed previously, the K eigenmodes may be a partial sum approximation of an eigen decomposition of the channel correlation matrix R (computed by the MS based on measurements of pilot(s) transmitted by the BS, for example). The BS may make use of the reduced rank representation of the channel correlation matrix R in its transmitter's parameters, such as transmit precoding vector, matrices, and so on (block 560). The BS may then transmit to the MS using the adjusted transmitter (block 565) and BS operation 550 may then terminate.

FIG. 5*c* illustrates a flow diagram of a second BS operation 575 for transmitting to a MS based on received partial channel information. BS operation 575 may be descriptive of operations occurring in a BS when the BS receives feedback information from a MS. BS operation 575 may execute periodically or whenever the BS receives feedback information from the MS.

BS operation 575 may begin when the BS receives a reduced rank representation of a channel correlation matrix R (block 580). The reduced rank representation of the channel correlation matrix R may be in the form of K eigenmodes from the BS. As discussed previously, the K eigenmodes may be a partial sum approximation of an eigen decomposition of the channel correlation matrix R (computed by the MS based on measurements of pilot(s) transmitted by the BS, for example). From the reduced rank representation of the channel correlation matrix R, the BS may be able to regenerate an approximation of the channel correlation matrix R (block 582). The BS may make use of the approximation of the channel correlation matrix R in its transmitter's parameters, such as transmit precoding vector, matrices, and so on (block 584). The BS may then transmit to the MS using the adjusted transmitter (block 586) and BS operation 575 may then terminate.

Figure 6A:
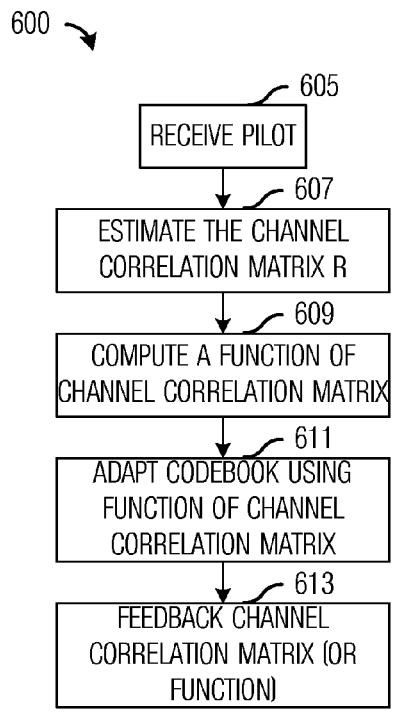
FIG. 6a is a flow diagram of MS operations in feeding back long term channel information to a BS.

FIG. 6*a* illustrates a flow diagram of MS operations 600 in feeding back long term channel information to a BS. MS operations 600 may be indicative of operations occurring in a MS, such as MS 203, as the MS provides channel information, e.g., long term channel information, to a BS, such as BS 201, serving the MS. MS operations 600 may occur while the MS is in a normal operating mode and while the BS continues to serve the MS.

MS operations 600 may begin with the MS receiving a pilot transmitted by the BS (block 605). The pilot may be a signal transmitted by the BS that may be used to assist the MS to join a communications network containing the BS, measure channels, and so forth. Using the pilot, the MS may measure a channel between itself and the BS and from the measurement of the channel, the MS may determine an estimate of the channel (block 607). According to an embodiment, instead of the pilot, the MS may use a reference signal transmitted by the BS or other transmissions made by the BS to measure and determine an estimate of the channel.

From the estimate of the channel, the MS may be able to generate or update long term channel information for the channel. For example, the MS may maintain a channel correlation matrix R for the channel and the MS may update the channel correlation matrix R with the estimate of the channel. Using the channel correlation matrix R, the MS may compute a function of the channel correlation matrix R (block 609). As an example, the MS may compute a square root of the channel correlation matrix R, expressible as $\sqrt{R}$. Although the discussion focuses on the square root of the channel correlation matrix R, other functions may be used, such as $\sqrt{R_k}$ instead of $\sqrt{R}$, where $R_k$ is a reduced rank of the channel correlation matrix R using k leading eigenmodes.

The function of the channel correlation matrix R may be used to adapt a baseline codebook to produce an adapted codebook (block 611). As an example, the MS may adapt the baseline codebook as follows:

$$W_{adapted} = \text{normalize}(\sqrt{R} * W_{baseline}),$$

where function normalize( ) normalizes each column to be of norm 1, and $W_{baseline}$ is the baseline codebook. The MS may provide as feedback channel information the long term channel information, such as, long term channel statistics, the channel correlation matrix R, a function of the channel correlation matrix R, a reduced rank representation of the channel correlation matrix $R_k$, or a function of the reduced rank representation of the channel correlation matrix $R_k$ (block 613). Codebook quantization may be used to reduce feedback information overhead. MS operations 600 may then terminate.

Figure 6C:
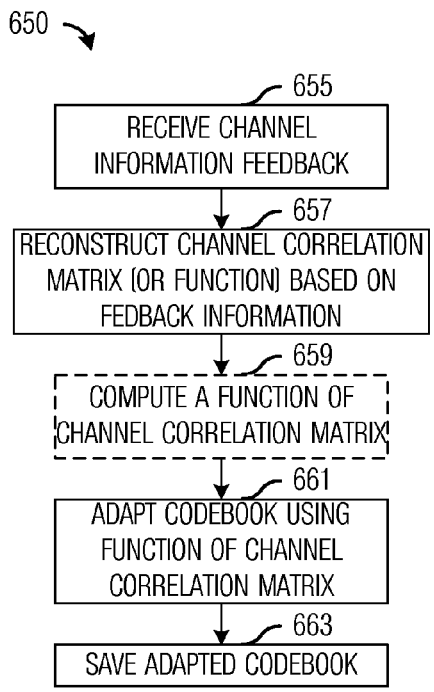
FIG. 6c is a flow diagram of BS operations in adapting a codebook using long term channel information received from a MS.
Figure 6B:
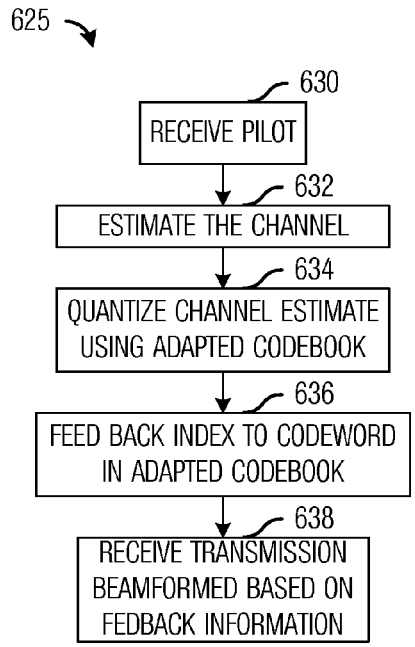
FIG. 6b is a flow diagram of MS operations in receiving a transmission from a BS.

FIG. 6*b* illustrates a flow diagram of MS operations 625 in receiving a transmission from a BS. MS operations 625 may be indicative of operations occurring in a MS, such as MS 203, as the MS receives a transmission from a BS, such as BS 201, serving the MS. MS operations 625 may occur while the MS is in a normal operating mode and while the BS continues to serve the MS.

MS operations 625 may begin with the MS receiving a pilot transmitted by the BS (block 630). The pilot may be a signal transmitted by the BS that may be used to assist the MS to join a communications network containing the BS, measure channels, and so forth. Using the pilot, the MS may measure a channel between itself and the BS and from the measurement of the channel, the MS may determine an estimate of the channel (block 632). According to an embodiment, instead of the pilot, the MS may use a reference signal transmitted by the BS or other transmissions made by the BS to measure and determine an estimate of the channel.

The MS may quantize the estimate of the channel using an adapted codebook (block 634). As discussed previously, the adapted codebook may be a baseline codebook adjusted using a function of a channel correlation matrix R or a function of a reduced rank representation of the channel correlation matrix $R_k$. Quantization of the estimate of the channel may include selecting a codeword from the adapted codebook that satisfies the following expression $$\arg\max_{w_i \in W_{baseline}} |H\Phi w_i|,$$

where H is the estimate of the channel, $\Phi$ is the long term channel information, such as long term channel statistics, a channel correlation matrix R, a reduced rank representation of the channel correlation matrix R, a function of either a channel correlation matrix R, or a reduced rank representation of the channel correlation matrix $R_k$, and $w_i$ is a codeword from a baseline codebook $W_{baseline}$.

The MS may transmit as feedback channel information to the BS, an index to the codeword in the baseline codebook $W_{baseline}$ that satisfies the above expression (block 636). The MS may then receive a transmission from the BS, wherein the transmission is beamformed based on the information feedback by the MS (block 638) and MS operations 625 may then terminate.

FIG. 6c illustrates a flow diagram of BS operations 650 in adapting a codebook using long term channel information received from a MS. BS operations 650 may be indicative of operations occurring in a BS, such as BS 201, as the BS adapts a codebook using feedback channel information provided by a MS, such as MS 203. BS operations 650 may occur while the BS is in a normal operating mode and is serving the MS.

BS operations 650 may begin with the BS receiving channel information feedback from the MS (block 655). According to an embodiment, the feedback channel information includes long term channel information, such as long term channel statistics, a channel correlation matrix R, or a reduced rank representation of a channel correlation matrix $R_k$. According to another embodiment, the feedback channel information includes a function of either a channel correlation matrix R or a reduced rank representation of a channel correlation matrix $R_k$. The BS may reconstruct the channel correlation matrix R, the function of the channel correlation matrix R, the reduced rank representation of a channel correlation matrix $R_k$, the function of the reduced rank representation of a channel correlation matrix $R_k$, or long term channel statistics using the feedback channel information (block 657).

If the feedback channel information only included the channel correlation matrix R or the reduced rank representation of a channel correlation matrix $R_k$, then the BS may compute the function of the channel correlation matrix R or the function of the reduced rank representation of a channel correlation matrix $R_k$ (block 659). The BS may adapt the codebook, for example, a baseline codebook $W_{baseline}$, using either the function of the channel correlation matrix R or the function of the reduced rank representation of a channel correlation matrix $R_k$ to produce an adapted codebook (block 661). The BS may save the adapted codebook (block 663) and BS operations 650 may then terminate.

Figure 6D:
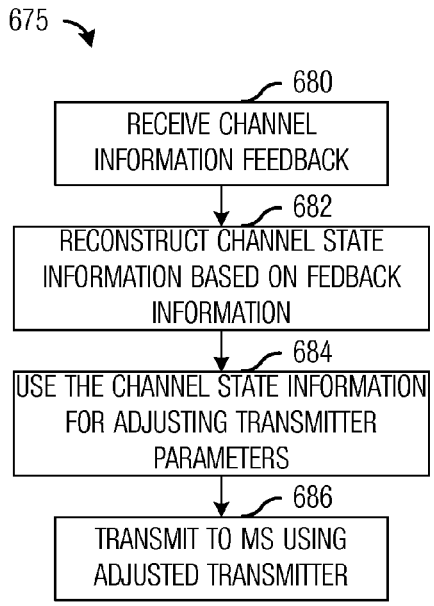
FIG. 6d is a flow diagram of BS operations in transmitting information to a MS.

FIG. 6d illustrates a flow diagram of BS operations 675 in transmitting information to a MS. BS operations 675 may be indicative of operations occurring in a BS, such as BS 201, as the BS transmits information to a MS, such as MS 203. BS operations 675 may occur while the BS is in a normal operating mode and is serving the MS.

BS operations 675 may begin with the BS receiving feedback channel information from the MS (block 680). According to an embodiment, the feedback channel information includes short term channel information, such as an index to a codeword in a baseline codebook $W_{baseline}$ or an adapted codebook that satisfies $$\arg\max_{w_i \in W_{baseline}} |H\Phi w_i|,$$

H is the estimate of the channel, $\Phi$ is the long term channel information, such as long term channel statistics, a channel correlation matrix R, a reduced rank representation of the channel correlation matrix R, the function of either a channel correlation matrix R, or a reduced rank representation of the channel correlation matrix $R_k$, and $w_i$ is a codeword from a baseline codebook $W_{baseline}$.

The BS may reconstruct the short term channel information using the feedback channel information, i.e., the index to the adapted codebook (block 682) and use the short term channel information to adjust its transmitter's parameters (block 684). The BS may then use the adjusted transmitter to transmit information to the MS (block 686) and BS operations 675 may then terminate.

As discussed previously, it may be shown that quantizing a transformed channel HV in its long term channel eigenspace may be equivalent to quantizing the channel H directly, with added advantages that may include a reduction in feedback channel information as well as resources, such as memory, processing power, and so forth, at a MS that is generating the feedback channel information.

Figures 7A, 7B:
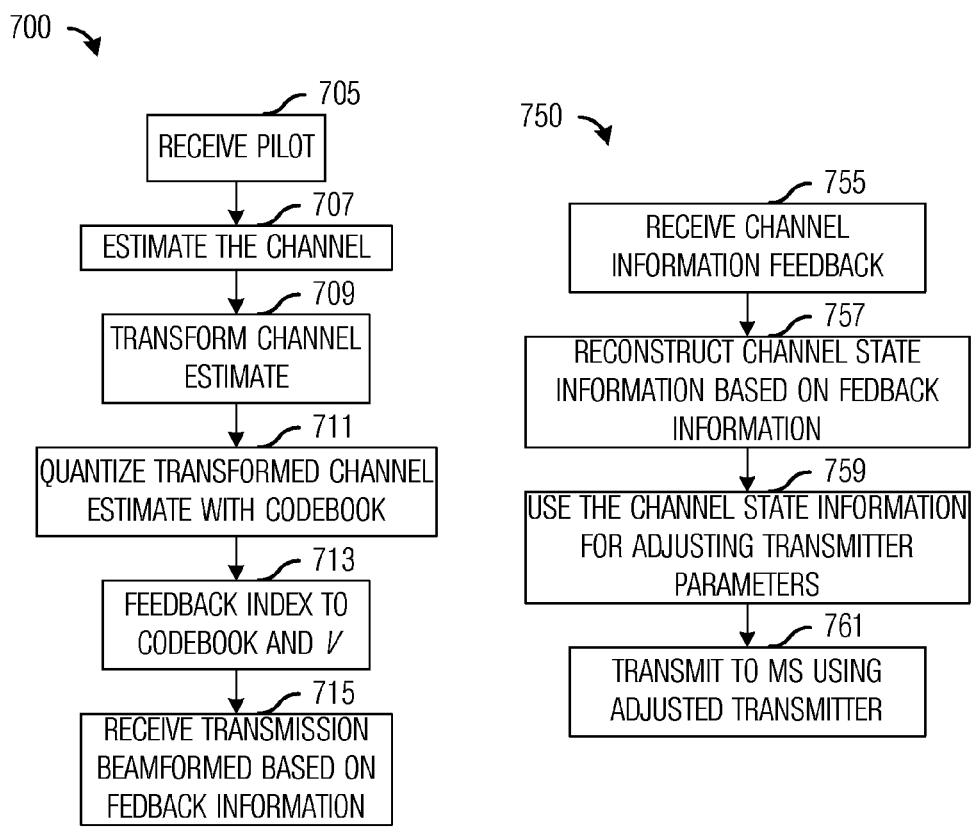
FIG. 7a is a flow diagram of MS operations in receiving a transmission from a BS.
FIG. 7b is a flow diagram of BS operations in transmitting information to a MS.

FIG. 7a illustrates a flow diagram of MS operations 700 in receiving a transmission from a BS. MS operations 700 may be indicative of operations occurring in a MS, such as MS 203, as the MS receives a transmission from a BS, such as BS 201. MS operations 700 may occur while the MS is in a normal operating mode and while the BS continues to serve the MS.

MS operations 700 may begin with the MS receiving a pilot transmitted by the BS (block 705). Using the pilot, the MS may measure a channel between itself and the BS and from the measurement of the channel, the MS may determine an estimate of the channel (block 707). The MS may then transform the estimate of the channel into a long term channel eigenspace by applying V, an eigenvector matrix based on a channel correlation matrix R (block 709). The MS may maintain the channel correlation matrix R and update it accordingly based on estimates of the channel. The MS may compute V as needed from the channel correlation matrix R.

The transformed estimate of the channel may be quantized using a matching codebook (block 711) and an index to a codeword from the matching codebook as well as V may be transmitted to the BS as feedback channel information (block 713). The feedback of the index and V may occur at different frequencies. Since V is a function of long term channel information (a channel correlation matrix R) and may change relatively slowly, updates to V may be fedback to the transmitter at a lower rate than the index, which provides short term channel information. To help reduce feedback information overhead, V may also be quantized, wherein the quantization of V may make use of a codebook different from the matching codebook used to quantize the transformed estimate of the channel.

As an example of the reduction in feedback channel information as well as resources, consider a situation where a BS has four transmit antennas. With direct quantization of the estimate of the channel, a codebook may need to be a dimension four codebook, while with quantization of the transformed estimate of the channel, the dimension of the codebook may depend on V, so if V includes two dominant eigenvectors of the channel correlation matrix R, e.g., V is a dimension two matrix, the matching codebook is a dimension two codebook. The MS may receive a transmission that is beamformed based on information provided in the feedback channel information (block 715) and MS operations 700 may then terminate.

FIG. 7b illustrates a flow diagram of BS operations 750 in transmitting information to a MS. BS operations 750 may be indicative of operations occurring in a BS, such as BS 201, as the BS transmits information to a MS, such as MS 203. BS operations 750 may occur while the BS is in a normal operating mode and is serving the MS.

BS operations 750 may begin with the BS receiving feedback channel information from the MS (block 755). According to an embodiment, the feedback channel information includes an index to a codeword to a matching codebook used to quantize a transformed estimate of a channel, wherein the transformation moves the estimate of the channel into its long term channel eigenspace.

The BS may reconstruct the channel information using the feedback channel information, i.e., the index to the matching codebook (block 757) and use the channel information to adjust its transmitter's parameters (block 759). The BS may then use the adjusted transmitter to transmit information to the MS (block 761) and BS operations 750 may then terminate.

Consider an 8×2 configuration wherein each transmitter is equipped with 8 antennas and each receiver is equipped with 2 receive antennas. In an initial study, a situation where one stream transmission per user and flat fading channels is considered. Extension to more general cases is possible. In the following, codebooks such that each codeword is an 8×1 transmit beamforming vector are presented. For each receiver, maximal ratio combining (MRC) is performed in SU-MIMO. Full channel state information is assumed available at the receiver side, while quantization of the channel is done through an 8-antenna 4-bit codebook. Six different codebook designs are used as listed in Table 1. Other numerical simulation assumptions and parameters are listed in Table 2.

TABLE 1

Codebook designs

| Codebook | Adaptive | Baseline codebook |
|---|---|---|
| Codebook 1 GLP | No | GLP |
| Codebook 2 R-GLP-2 | Yes, k = 2 in eq. (2) | GLP |
| Codebook 3 R-GLP-8 | Yes, k = 8 in eq. (2) | GLP |
| Codebook 4 CHT | No | CHT |
| Codebook 5 R-CHT-2 | Yes, k = 2 in eq. (2) | CHT |
| Codebook 6 R-CHT-8 | Yes, k = 8 in eq. (2) | CHT |

TABLE 2

Simulation Assumptions

| Parameters | Assumption |
|---|---|
| Channel model | Spatial Channel Model (SCM) |
| Fading scenario | Urban Macro |
| Sample density | 15k sample/second |
| UE speed of interest | 3 Km/h |
| Number of antenna elements (BS, UE) | (8, 2) |
| Antenna separation (BS, UE) | (0.5, 0.5) and (4, 0.5) wavelength |
| Scheduler | Greedy user selection (2 users out of 10) |
| Receiver algorithm | MRC for SU-MIMO and MMSE for MU-MIMO |
| Channel Estimation | Ideal |
| Channel correlation update | Updated once per 1000 samples |
| Channel correlation accuracy | Computed from 1000 channel samples; Ideal |

Figure 8A:
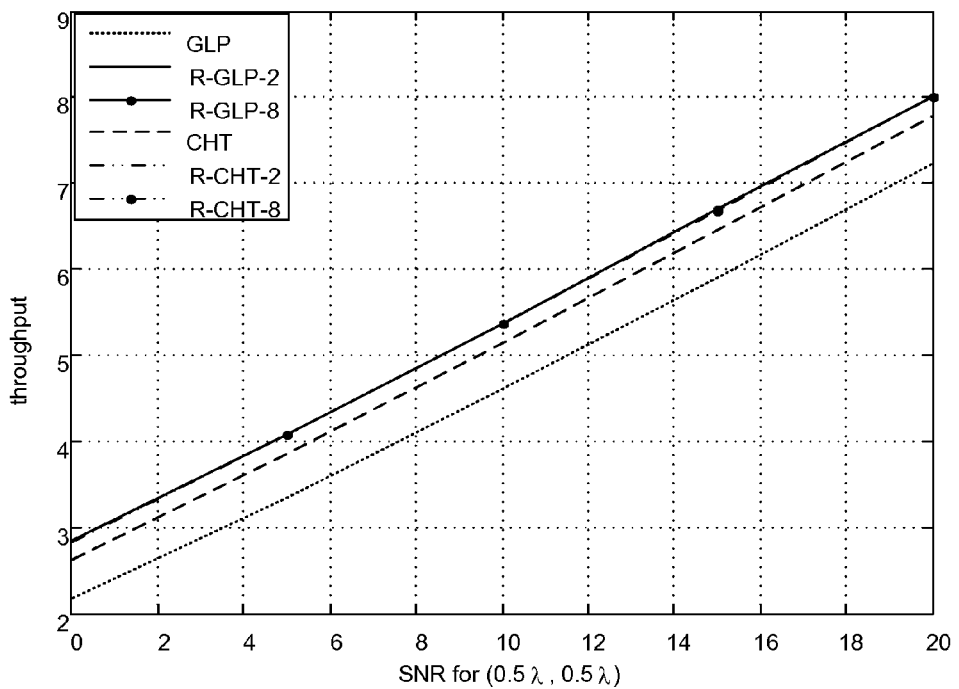
FIGS. 8a and 8b are plots of signal to noise ratios versus throughput for several different SU-MIMO communications system configurations.
Figure 8B:
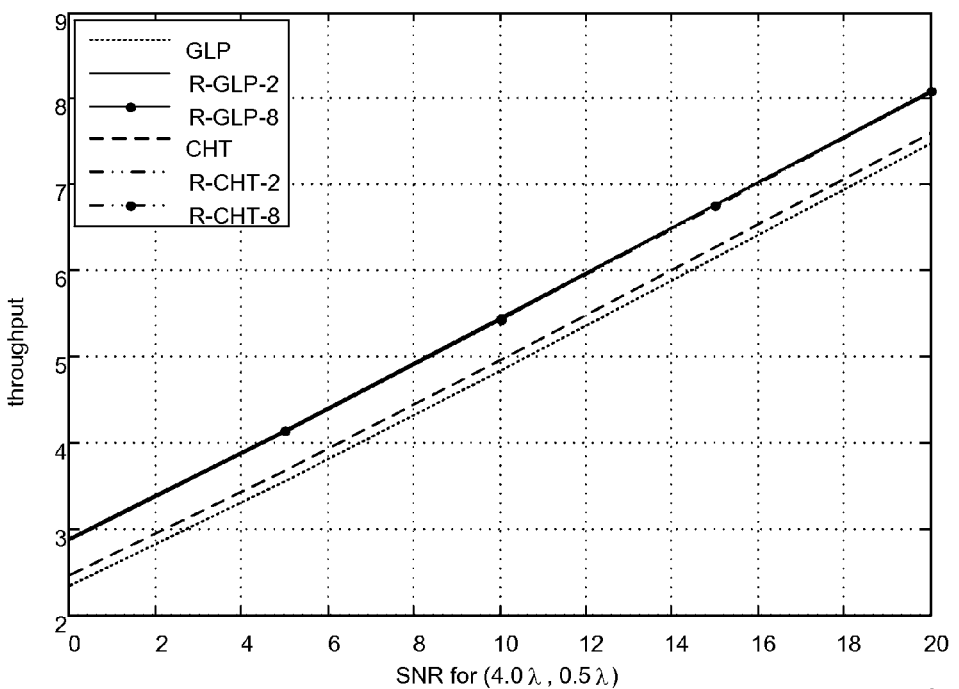

FIG. 8a illustrates a data plot of signal to noise ratio (SNR) versus throughput for SU-MIMO with antenna spacing of 0.5λ and 0.5λ at transmitter and receiver, respectively, for wireless communications systems using the six different codebooks shown in Table 1. FIG. 8b illustrates a data plot of signal to noise ratio (SNR) versus throughput for SU-MIMO with antenna spacing of 4.0λ and 0.5λ at transmitter and receiver, respectively, for wireless communications systems using the six different codebooks shown in Table 1.

As expected, the adaptive codebooks perform better than fixed GLP and CHT codebooks. Compared with the fixed CHT design, the adaptive codebook achieves about 0.8 dB performance gain for antenna spacing of (0.5λ, 0.5λ) and 1.8 dB performance gain for antenna spacing of (4.0λ, 0.5λ). Once again, for SU-MIMO, the performance improvement may not be large enough to justify the additional complexity associated with adaptive codebooks.

For MU-MIMO, a pool of ten (10) users carrying greedy user scheduling is considered. Up to two users may be scheduled in a single time instance. In an initial study, a situation where one stream transmission per user and flat fading channels is considered. Extension to more general cases is possible. In the following, codebooks such that each codeword is an 8×1 transmit beamforming vector are presented. For each receiver, minimum mean square error (MMSE) combining is chosen as a default receiver model. Additional considerations include: full channel state information to be available at the receiver side, while quantization of the channel is done through an 8-antenna 4-bit codebook. Again, Table 1 lists the six different codebook designs studied and Table 2 lists numerical simulation assumptions and parameters.

Figure 8C:
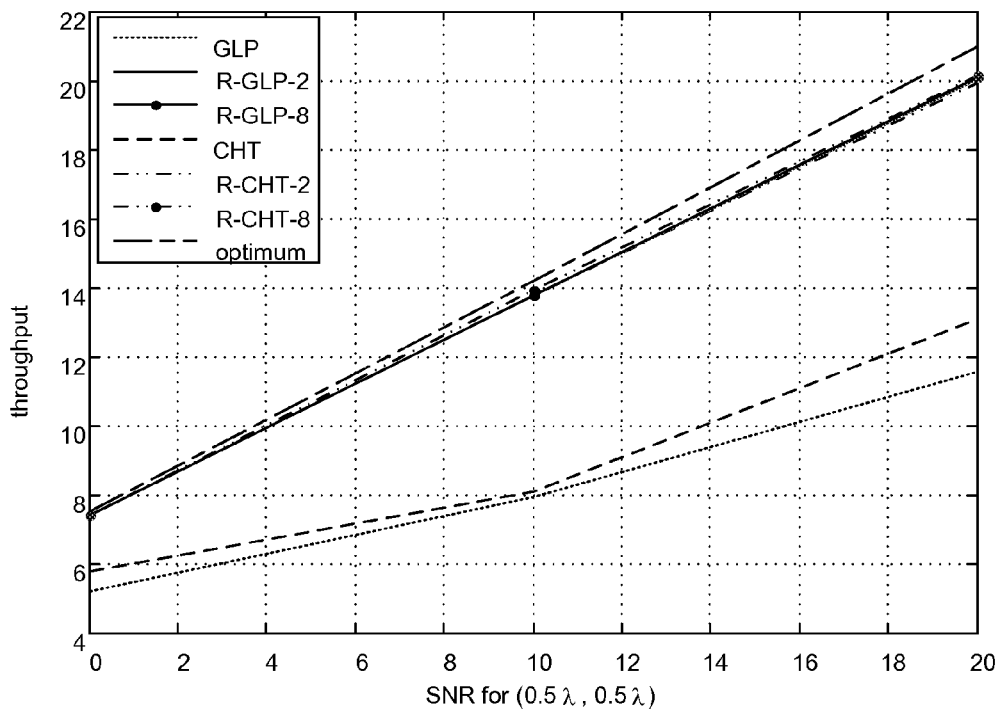
FIG. 8c is a plot of signal to noise ratio versus throughput for several different MU-MIMO communications system configurations.
Figure 8D:
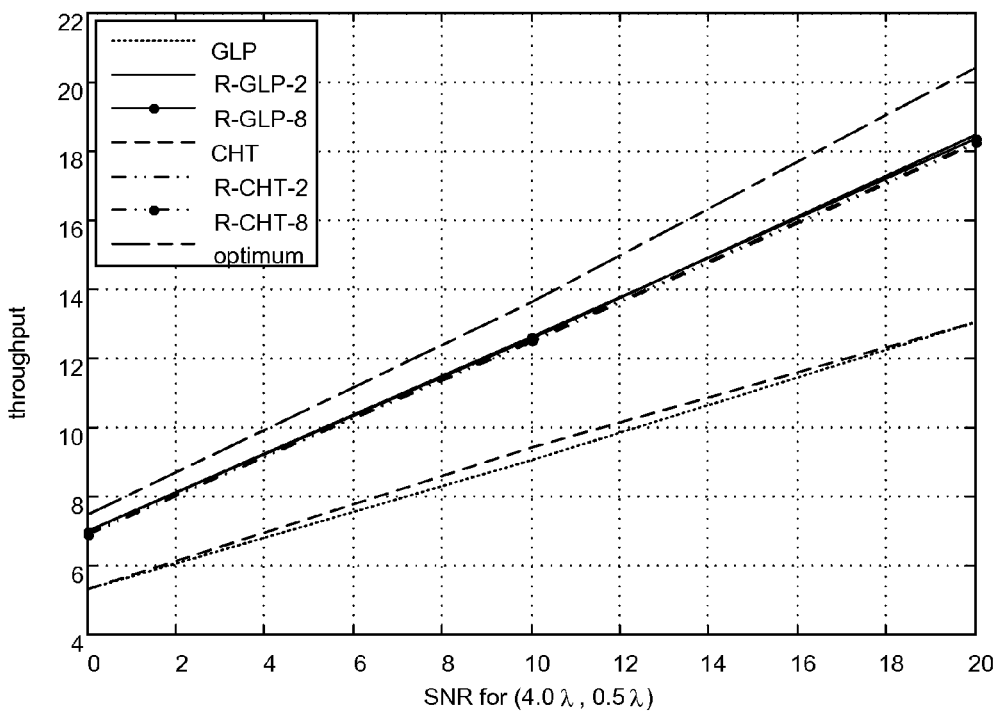
FIG. 8d is a plot of signal to noise ratio versus throughput for several different SU-MIMO communications system configurations using different codebooks.

FIG. 8c illustrates a data plot of signal to noise ratio (SNR) versus throughput for MU-MIMO with antenna spacing of 0.5λ and 0.5λ at transmitter and receiver, respectively, for wireless communications systems using the six different codebooks shown in Table 1. Also shown in FIG. 8c is curve representing an optimum codebook. FIG. 8d illustrates a data plot of signal to noise ratio (SNR) versus throughput for SU-MIMO with antenna spacing of 4.0λ and 0.5λ at transmitter and receiver, respectively, for wireless communications systems using the six different codebooks shown in Table 1. Also shown in FIG. 8d is curve representing an optimum codebook.

Figure 9A:
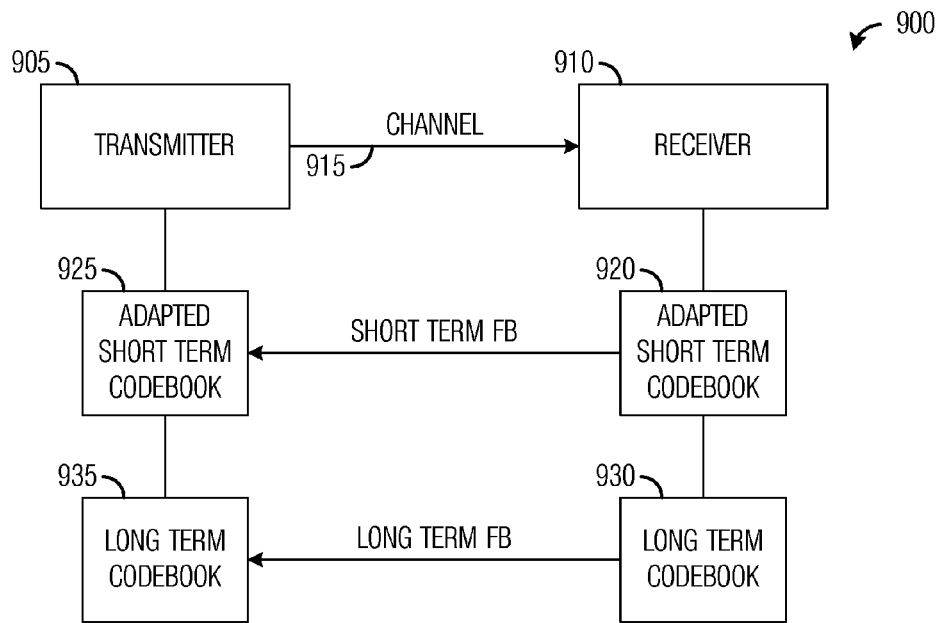
FIG. 9a is a diagram of a wireless communications system utilizing dual codebooks to improve communications performance.

FIG. 9a illustrates a wireless communications system 900 utilizing dual codebooks to improve communications performance. Wireless communications system 900 includes a transmitter 905 transmitting to a receiver 910 over a channel 915. Receiver 910 provides feedback information to transmitter 905 to allow transmitter 905 to improve performance.

However, instead of using a baseline codebook that remains fixed, wireless communications system 900 utilizes an adapted codebook that may be adjusted over time to meet changing operating conditions. Like baseline codebooks, adapted codebooks are shared by both transmitter 905 and receiver 910 (shown as adapted short term codebook 920 for receiver 910 and adapted short term codebook 925 for transmitter 905).

Adjusting the adapted codebook may be performed using long term channel information, such as long term channel statistics, a channel correlation matrix R, a reduced rank representation of the channel correlation matrix R, a function of either the channel correlation matrix R, or the reduced rank representation of the channel correlation matrix $R_k$. As receiver 910 adjusts its adapted short term codebook 920 using long term channel information, receiver 910 may either feedback the long term channel information or a function of the long term channel information back to transmitter 905 so that transmitter 905 may also adjust its adapted short term codebook 925. An example of a function of the long term channel information fedback to transmitter 905 may be a reduced rank version of the long term channel information. Once transmitter 905 receives the long term channel information or the function of the long term channel information fedback by receiver 910, transmitter 905 may reconstruct the long term channel information in order to adjust its adapted short term codebook 925. The feedback of the long term channel information or the function of the long term channel information may occur at a different frequency (usually lower) than the feedback of the quantized short term channel information, such as measurements of channel 915.

In order to further reduce feedback channel overhead, receiver 910 may also quantize the long term channel information or the function of the long term channel information. The quantization of the long term channel information or the function of the long term channel information may be performed using a long term codebook (shown as long term codebook 930 for receiver 910 and long term codebook 935 for transmitter 905). The quantization of the long term channel information or the function of the long term channel information may occur at several levels. A first quantization level may be a codebook level quantization of the long term channel information, wherein an index may be used to represent a quantized version of the long term channel information. With codebook level quantization, only the index needs to be fedback to transmitter 905. A second quantization level may be a scalar level quantization of the long term channel information, wherein individual terms of the long term channel information may be quantized to a desired precision. With scalar level quantization, a long term codebook may only have to store scalar values at the desired precision. For example, if a value of a term of the long term channel information is actually 0.33333333, a scalar value with two decimal place precision may be 0.33 may be stored in the long term codebook.

Transmitter 905 may make use of a precoding matrix as recommended by receiver 910 in an indicator feedback by receiver 910 in transmissions to receiver 910. Alternatively, transmitter 905 may make use of a precoding matrix as recommended by receiver 910 to determine an alternate precoding matrix that it may use in transmissions to receiver 910.

Figure 9B:
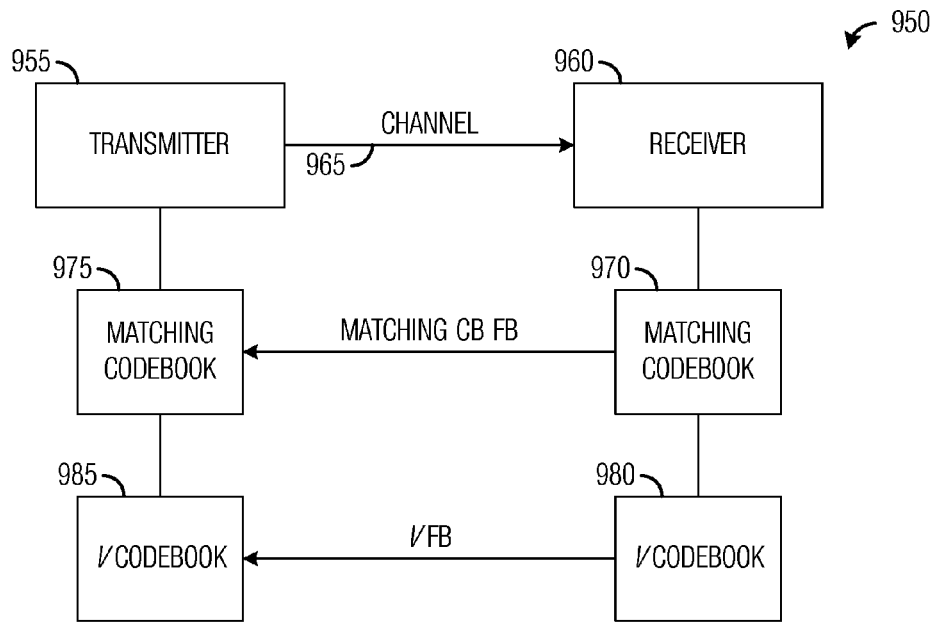
FIG. 9b is a wireless communications system utilizing dual codebooks and channel transformation to improve communications performance.

FIG. 9b illustrates a wireless communications system 950 utilizing dual codebooks and channel transformation to improve communications performance. Wireless communications system 950 includes a transmitter 955 transmitting to a receiver 960 over a channel 965. Receiver 960 provides feedback information to transmitter 955 to allow transmitter 955 to improve performance.

Wireless communications system 950 makes use of a channel transformation in addition to adapting a codebook of short term information to improve communications performance. According to an embodiment, a transformation V applied to channel 965 may be based on long term channel information. Particularly, the transformation V may be a function of a channel correlation matrix R for channel 965. Preferably, the transformation V may be the eigenvectors of the channel correlation matrix R.

Additionally, instead of using a baseline codebook that remains fixed, wireless communications system 950 utilizes an adapted codebook that may be adjusted over time to meet changing operating conditions. Like baseline codebooks, adapted codebooks are shared by both transmitter 955 and receiver 960. Since channel 965 undergoes a transformation by transform V, a codebook that matches the transformed channel is used by both transmitter 955 and receiver 960 (shown as matching codebook 970 for receiver 960 and matching codebook 975 for transmitter 955).

As discussed previously, the matching codebooks (matching codebook 970 and matching codebook 975) may be adapted based on long term channel information, such as long term channel statistics, a channel correlation matrix R, a reduced rank representation of the channel correlation matrix R, a function of either the channel correlation matrix R, or the reduced rank representation of the channel correlation matrix $R_k$.

Since the transform V is based on long term information, receiver 960 may not need to feedback information related to V at as great a frequency as it feeds back short term information, i.e., indices to matching codebook 970 used to quantized the transformed channel. Therefore, the feedback of the long term information related to the transform V may occur at a different frequency (usually lower) than the feedback of the short term information related to the quantized transformed channel.

In order to further reduce feedback channel overhead, receiver 960 may also quantize the long term information related to the transform V by using a V codebook (shown as V codebook 980 for receiver 960 and V codebook 985 for transmitter 955). The quantization of the long term channel information related to the transform V may occur at several levels, for example, at a codebook level or at a scalar level.

Transmitter 955 may make use of a precoding matrix constructed based on the transformed channel information provided by receiver 960 in transmissions to receiver 960.

Advantageous features of embodiments of the invention may include: a method for a communications device operation, the method comprising: receiving a pilot transmitted by a controller; computing a channel estimate for a channel between the controller and a communications device, the computing being based on the pilot; computing a channel correlation matrix for the channel based on the channel estimate; transmitting a reduced rank representation of the channel correlation matrix to the controller as a first feedback information; adapting a first codebook based on the reduced rank representation of the channel correlation matrix; computing a representation of the channel using the adapted first codebook; transmitting the representation of the channel as a second feedback information; and receiving a transmission beamformed based on the first feedback information and the second feedback information. The method could further include, wherein the channel correlation matrix comprises a time domain channel correlation matrix or a frequency domain channel correlation matrix. The method could further include, wherein adapting a first codebook comprises multiplying a first codebook matrix with the channel correlation matrix or multiplying the first codebook matrix with a power of the channel correlation matrix. The method could further include, wherein computing a channel correlation matrix further comprises computing a reduced rank representation of the channel correlation matrix. The method could further include, wherein computing a reduced rank representation comprises: performing eigen decomposition on the channel correlation matrix; and selecting n dominant eigencomponents from results of the eigen decomposition of the channel correlation matrix as the reduced rank representation of the channel correlation matrix, where n is an integer number, wherein n is smaller than a total number of eigencomponents in the results. The method could further include, wherein n is equal to two. The method could further include, wherein computing a reduced rank representation further comprises quantizing the n dominant eigencomponents. The method could further include, wherein computing a reduced rank representation of the channel correlation matrix further comprises computing a function of the reduced rank representation of the channel correlation matrix. The method could further include, wherein the function comprises a square root of the reduced rank representation of the channel correlation matrix. The method could further include, further comprising quantizing the representation of the channel correlation matrix. The method could further include, further comprising quantizing the reduced rank representation of the channel correlation matrix with a second codebook. The method could further include, wherein the first feedback information occurs at a first frequency in a time domain or a frequency domain and the second feedback information occurs at a second frequency in the time domain or the frequency domain, and wherein the first frequency is different from the second frequency.

Advantageous features of another embodiment could include: a method for communications node operations, the method comprising: estimating a communications channel between a communications node and a controller serving the communications node; quantizing the estimated communications channel based on an adapted codebook by selecting a codeword from the adapted codebook that maximizes a first selection criterion; transmitting an index to the selected codeword to the controller; estimating channel statistics for the communications channel; adjusting the adapted codebook based on the channel statistics; quantizing the channel statistics based on a channel statistics codebook by selecting a channel statistics codeword from the channel statistics codebook that maximizes a second selection criterion; transmitting a channel statistics index to the channel statistics codebook to the controller; and receiving a transmission from the controller, wherein the transmission is precoded based on the index and the channel statistics index. The method could further include, receiving a pilot transmitted by the controller, wherein the pilot is used in estimating the communications channel. The method could further include, wherein the channel statistics comprise time domain channel statistics, frequency domain channel statistics, or a combination thereof. The method could further include, wherein the time domain channel statistics comprise a function of a time domain channel correlation matrix, eigenvectors of the time domain channel correlation matrix, eigenvalues of the time domain channel correlation matrix, angle of departure or angle of arrival of the communications channel, and a combination thereof. The method could further include, wherein the channel statistics index corresponds to a quantized version of the time domain channel correlation matrix or to a quantized version of a function of the time domain channel correlation matrix. The method could further include, wherein the channel statistics index corresponds to quantized versions of elements of the time domain channel correlation matrix or to quantized versions of elements of a function of the time domain channel correlation matrix. The method could further include, wherein the channel statistics comprise a reduced rank representation of the time domain channel correlation matrix or a reduced rank representation of a function of the time domain channel correlation matrix, and wherein the channel statistics index corresponds to quantized versions of elements of the reduced rank representation of the time domain channel correlation matrix or to quantized versions of elements of the function of the reduced rank representation of the time channel correlation matrix. The method could further include, wherein frequency domain channel statistics comprise a function of frequency domain channel characteristics, eigenvectors of the frequency domain channel correlation matrix, eigenvalues of the frequency domain channel correlation matrix, angle of departure or angle of arrival of the communications channel, and a combination thereof. The method could further include, wherein the transmitting an index occurs at a first frequency and the transmitting a channel statistics index occurs at a second frequency, and wherein the first frequency is different from the second frequency. The method could further include, wherein transmitting an index occurs at a first frequency in the frequency domain and the transmitting a channel statistics index occurs at a second frequency in the frequency domain, and wherein the first frequency is different from the second frequency. The method could further include, wherein the first selection criterion comprises evaluating, where H is the estimated communications channel, is the channel statistics, Wbaseline is a baseline codebook, and wi is a codeword in the baseline codebook.

The method could further include, wherein identical copies of the channel statistics codebook are maintained at both the communication node and the controller. The method could further include, wherein identical copies of the adapted codebook are adapted in a same manner at both the communication node and the controller.

Advantageous features of still another embodiment include: a method for quantizing feedback information, the method comprising: receiving a pilot transmitted by a controller; computing a channel estimate for a channel between the controller and a communications device, the computing being based on the pilot; transforming the channel estimate into its representation in a subspace of the channel; quantizing the transformed channel estimate using a codebook, thereby producing an index to a codeword in the codebook; transmitting the index to the controller; and receiving a transmission beamformed based on the index and the subspace. The method could further include, wherein the subspace is a long term channel eigenspace. The method could further include, wherein the subspace is a wideband channel eigenspace. The method could further include, wherein transforming the channel estimate comprises multiplying the channel estimate with a matrix based on channel statistics. The method could further include, wherein the channel statistics comprise a channel correlation matrix. The method could further include, wherein the matrix comprises eigenvectors of a reduced rank representation of the channel statistics. The method could further include, wherein the matrix is based on a reduced rank representation of the channel statistics. The method could further include, wherein the codebook is matched to the transformed channel estimate. The method could further include, further comprising transmitting the subspace of the channel to the controller. The method could further include, receiving the subspace of the channel from the controller.

Advantageous features of yet another embodiment include: a method for communications node operation, the method comprising: estimating a communications channel between a communications node and a controller serving the communications node; transforming the estimated communications channel with channel statistics, thereby producing a transformed estimate of the communications channel; quantizing the transformed estimate of the communications channel based on a first codebook by selecting a codeword from the first codebook that maximizes a first selection criterion; transmitting a first index to the selected codeword to the controller; estimating the channel statistics for the communications channel; adjusting the first codebook based on the channel statistics; quantizing the channel statistics based on a second codebook by selecting a second codeword from the second codebook that maximizes a second selection criterion; transmitting a second index to the second codebook to the controller; and receiving a transmission from the controller, wherein the transmission is precoded based on the first index and the second index. The method could further include, wherein the channel statistics comprise time domain channel statistics, wherein the transmitting a first index occurs at a first frequency and the transmitting a second index occurs at a second frequency, and wherein the first frequency is different from the second frequency. The method could further include, wherein the channel statistics comprise frequency domain channel statistics, wherein transmitting an index occurs at a first frequency in the frequency domain and the transmitting a channel statistics index occurs at a second frequency in the frequency domain, and wherein the first frequency is different from the second frequency. The method could further include, wherein the channel statistics comprise time domain channel statistics, frequency domain channel statistics, and a combination thereof. The method could further include, wherein the time domain channel statistics comprise eigenvectors of a time domain channel correlation matrix for the communications channel, eigenvalues of the time domain channel correlation matrix for the communications channel, and a combination thereof. The method could further include, wherein transforming the estimated communications channel comprises multiplying the estimated communications channel with the eigenvectors of the channel correlation matrix. The method could further include, wherein the first codebook and the transformed estimate of the communications channel have approximately identical first order moment and approximately identical second order moment. The method could further include, wherein identical copies of the first codebook are maintained at both the communication device and the controller. The method could further include, wherein identical copies of the second codebook are maintained at both the communication device and the controller.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications node operations, the method comprising:
   estimating a communications channel between a communications node and a controller serving the communications node;
   quantizing the estimated communications channel based on an adapted codebook by selecting a codeword from the adapted codebook that maximizes a first selection criterion;
   transmitting an index to the selected codeword to the controller;
   estimating channel statistics for the communications channel;
   adjusting the adapted codebook based on the channel statistics;
   quantizing the channel statistics based on a channel statistics codebook by selecting a channel statistics codeword from the channel statistics codebook that maximizes a second selection criterion;
   transmitting a channel statistics index to the channel statistics codebook to the controller; and
   receiving a transmission from the controller, wherein the transmission is precoded based on the index and the channel statistics index.

2. The method of claim 1, further comprising receiving a pilot transmitted by the controller, wherein the pilot is used in estimating the communications channel.

3. The method of claim 1, wherein the channel statistics comprise time domain channel statistics, frequency domain channel statistics, or a combination thereof.

4. The method of claim 1, wherein the transmitting an index occurs at a first frequency and the transmitting a channel statistics index occurs at a second frequency, and wherein the first frequency is different from the second frequency.

5. The method of claim 1, wherein transmitting an index occurs at a first frequency in a frequency domain and the transmitting a channel statistics index occurs at a second frequency in the frequency domain, and wherein the first frequency is different from the second frequency.

6. The method of claim 1, wherein the first selection criterion comprises evaluating $$\arg\max_{w_i \in W_{baseline}} |H\Phi w_i|,$$

where H is the estimated communications channel, $\Phi$ is the channel statistics, $W_{baseline}$ is a baseline codebook, and $w_i$ is a codeword in the baseline codebook.

7. The method of claim 1, wherein identical copies of the channel statistics codebook are maintained at both the communication node and the controller.

8. The method of claim 1, wherein identical copies of the adapted codebook are adapted in a same manner at both the communication node and the controller.

9. The method of claim 3, wherein frequency domain channel statistics comprise a function of frequency domain channel characteristics, eigenvectors of a frequency domain channel correlation matrix, eigenvalues of the frequency domain channel correlation matrix, angle of departure or angle of arrival of the communications channel, or a combination thereof.

10. The method of claim 3, wherein the time domain channel statistics comprise a function of a time domain channel correlation matrix, eigenvectors of the time domain channel correlation matrix, eigenvalues of the time domain channel correlation matrix, angle of departure or angle of arrival of the communications channel, or a combination thereof.

11. The method of claim 10, wherein the channel statistics index corresponds to a quantized version of the time domain channel correlation matrix or to a quantized version of a function of the time domain channel correlation matrix.

12. The method of claim 10, wherein the channel statistics index corresponds to quantized versions of elements of the time domain channel correlation matrix or to quantized versions of elements of a function of the time domain channel correlation matrix.

13. The method of claim 10, wherein the channel statistics comprise a reduced rank representation of the time domain channel correlation matrix or a reduced rank representation of a function of the time domain channel correlation matrix, and wherein the channel statistics index corresponds to quantized versions of elements of the reduced rank representation of the time domain channel correlation matrix or to quantized versions of elements of the function of the reduced rank representation of the time channel correlation matrix.

14. A method for communications node operation, the method comprising:
   estimating a communications channel between a communications node and a controller serving the communications node;
   transforming the estimated communications channel with channel statistics, thereby producing a transformed estimate of the communications channel;
   quantizing the transformed estimate of the communications channel based on a first codebook by selecting a codeword from the first codebook that maximizes a first selection criterion;
   transmitting a first index to the selected codeword to the controller;
   estimating the channel statistics for the communications channel;
   quantizing the channel statistics based on a second codebook by selecting a second codeword from the second codebook that maximizes a second selection criterion;
   transmitting a second index to the second codebook to the controller; and
   receiving a transmission from the controller, wherein the transmission is precoded based on the first index and the second index.

15. The method of claim 14, wherein the channel statistics comprise time domain channel statistics, wherein the transmitting a first index occurs at a first frequency and the transmitting a second index occurs at a second frequency, and wherein the first frequency is different from the second frequency.

16. The method of claim 14, wherein the channel statistics comprise frequency domain channel statistics, wherein transmitting an index occurs at a first frequency or granularity in the frequency domain and the transmitting a channel statistics index occurs at a second frequency or granularity in the frequency domain, and wherein the first frequency or granularity is different from the second frequency or granularity.

17. The method of claim 14, wherein the channel statistics comprise time domain channel statistics, frequency domain channel statistics, spatial domain channel statistics, or a combination thereof.

18. The method of claim 17, wherein the time domain channel statistics comprise eigenvectors of a time domain channel correlation matrix for the communications channel, eigenvalues of the time domain channel correlation matrix for the communications channel, or a combination thereof.

19. The method of claim 14, wherein a representation of the transformed estimate of the communications channel is a same or smaller dimensionality as a representation of the communications channel.

20. The method of claim 14, wherein codewords in the first codebook have a same or smaller dimensionality as a number of transmit antennas or antenna ports of the controller.

21. The method of claim 14, further comprising adjusting the first codebook based on the channel statistics.

22. The method of claim 18, wherein transforming the estimated communications channel comprises multiplying the estimated communications channel with the eigenvectors of the channel correlation matrix.

23. The method of claim 14, wherein the first codebook and the transformed estimate of the communications channel have approximately identical first order moment and approximately identical second order moment.

24. The method of claim 14, wherein identical copies of the first codebook are maintained at both the communication device and the controller.

25. The method of claim 14, wherein identical copies of the second codebook are maintained at both the communication device and the controller.

* * * * *